(12) United States Patent
Duffy et al.

(10) Patent No.: US 12,307,423 B2
(45) Date of Patent: May 20, 2025

(54) DIGITAL ASSISTANT-ENABLED DAILY BRIEFINGS

(71) Applicant: Apple Inc., Cupertino, CA (US)

(72) Inventors: Gavin K. Duffy, Los Gatos, CA (US); Kumar M. Pandya, San Jose, CA (US); Jessica J. Peck, Morgan Hill, CA (US); Robert S. Bowles Sinclair, Los Gatos, CA (US); Matthew R. Ward, Seattle, WA (US); Philomena F. Lobo, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 17/474,555

(22) Filed: Sep. 14, 2021

(65) Prior Publication Data

US 2022/0083986 A1 Mar. 17, 2022

Related U.S. Application Data

(60) Provisional application No. 63/078,197, filed on Sep. 14, 2020.

(51) Int. Cl.
*G06Q 10/1093* (2023.01)
*G06F 3/16* (2006.01)
*G06F 16/9535* (2019.01)
*G06F 16/9537* (2019.01)

(52) U.S. Cl.
CPC ......... *G06Q 10/1097* (2013.01); *G06F 3/167* (2013.01); *G06F 16/9535* (2019.01); *G06F 16/9537* (2019.01)

(58) Field of Classification Search
USPC ......................................................... 705/7.21
See application file for complete search history.

(56) References Cited

U.S. PATENT DOCUMENTS

| 7,301,463 B1 * | 11/2007 | Paterno ................. G16H 40/67 |
| | | 340/522 |
| 7,541,940 B2 | 6/2009 | Upton |
| 7,649,454 B2 | 1/2010 | Singh et al. |
| 7,920,857 B2 | 4/2011 | Lau et al. |

(Continued)

OTHER PUBLICATIONS

Gutierrez, Claudio, and Juan Carlos Hidalgo. "Suggesting what to do next." Proceedings of the 1988 ACM SIGSMALL/PC symposium on ACTES. 1988 (Year: 1988).*

(Continued)

*Primary Examiner* — Darlene Garcia-Guerra
(74) *Attorney, Agent, or Firm* — DLA Piper LLP (US)

(57) ABSTRACT

Methods and systems for providing a user-targeted report are provided. One method includes receiving an audio signal at a device, encoding a request for the report targeted to the requesting user. A set of incomplete tasks is identified, where tasks have a task-due timestamp and a reported status that indicates whether the task has been associated with a previous report. A set of upcoming tasks is identified from the incomplete tasks. A set of overdue tasks is identified from the incomplete tasks. From upcoming/overdue tasks a set of to-be-reported tasks is generated, via filtering criteria applied to the reported status of each task included in the upcoming/overdue tasks. The report includes a reminder for at least a portion of the tasks included in the set of to-be-reported tasks.

54 Claims, 17 Drawing Sheets

(56) References Cited

U.S. PATENT DOCUMENTS

| | | | |
|---|---|---|---|
| 8,069,422 B2 | 11/2011 | Sheshagiri et al. | |
| 8,140,368 B2 | 3/2012 | Eggenberger et al. | |
| 8,188,856 B2 | 5/2012 | Singh et al. | |
| 8,375,320 B2 | 2/2013 | Kotler et al. | |
| 8,527,263 B2* | 9/2013 | Bradley | G06F 40/56 |
| | | | 455/414.3 |
| 8,930,191 B2 | 1/2015 | Gruber et al. | |
| 9,986,419 B2 | 5/2018 | Naik et al. | |
| 10,249,300 B2 | 4/2019 | Booker et al. | |
| 10,269,345 B2 | 4/2019 | Castillo et al. | |
| 10,791,176 B2 | 9/2020 | Phipps et al. | |
| 10,944,859 B2 | 3/2021 | Weinstein et al. | |
| 11,200,027 B2 | 12/2021 | Aggarwal et al. | |
| 11,537,997 B2* | 12/2022 | Vangala | G06Q 10/10 |
| 11,669,788 B2* | 6/2023 | Balasubramanian | |
| | | | G06Q 10/06316 |
| | | | 705/7.15 |
| 11,704,552 B2* | 7/2023 | Sim | G06N 3/08 |
| | | | 706/25 |
| 2004/0243547 A1* | 12/2004 | Chhatrapati | H04L 67/535 |
| 2009/0165022 A1* | 6/2009 | Madsen | G06Q 10/109 |
| | | | 719/318 |
| 2010/0332280 A1 | 12/2010 | Bradley et al. | |
| 2011/0045841 A1 | 2/2011 | Kuhlke et al. | |
| 2011/0313803 A1 | 12/2011 | Friend et al. | |
| 2011/0314404 A1 | 12/2011 | Kotler et al. | |
| 2012/0242482 A1 | 9/2012 | Elumalai et al. | |
| 2013/0124605 A1* | 5/2013 | Klaka | G06Q 10/10 |
| | | | 709/203 |
| 2013/0275138 A1 | 10/2013 | Gruber et al. | |
| 2014/0033071 A1 | 1/2014 | Gruber et al. | |
| 2015/0095268 A1 | 4/2015 | Greenzeiger et al. | |
| 2015/0143281 A1* | 5/2015 | Mehta | G06Q 10/10 |
| | | | 715/781 |
| 2015/0169696 A1* | 6/2015 | Krishnappa | G06F 9/4893 |
| | | | 707/722 |
| 2015/0302334 A1* | 10/2015 | Thomas | G06F 3/0484 |
| | | | 705/7.26 |
| 2016/0062605 A1 | 3/2016 | Agarwal et al. | |
| 2016/0247110 A1* | 8/2016 | Sinha | G06Q 10/06316 |
| 2017/0344931 A1* | 11/2017 | Shenk | G06F 3/0481 |
| 2018/0114198 A1* | 4/2018 | Ghotbi | G06Q 10/1097 |
| 2019/0129749 A1* | 5/2019 | White | G06Q 10/109 |
| 2019/0199657 A1* | 6/2019 | Fawcett | G06Q 10/1097 |
| 2020/0143330 A1* | 5/2020 | Perumalla | G06F 40/279 |
| 2020/0226554 A1* | 7/2020 | Luna | G06F 9/542 |
| 2020/0302356 A1 | 9/2020 | Gruber et al. | |
| 2021/0073713 A1* | 3/2021 | Balasubramanian | |
| | | | G06Q 10/06312 |
| 2021/0081749 A1* | 3/2021 | Claire | G06F 3/005 |
| 2021/0117479 A1* | 4/2021 | Liu | G06F 9/485 |
| 2022/0261769 A1* | 8/2022 | Vellanti | G06Q 10/1097 |

OTHER PUBLICATIONS

White, Ryen W., Ahmed Hassan Awadallah, and Robert Sim. "Task completion detection: A study in the context of intelligent systems." Proceedings of the 42nd International ACM SIGIR Conference on Research and Development in Information Retrieval. 2019. (Year: 2019).*

Graus, David, et al. "Analyzing and predicting task reminders." Proceedings of the 2016 Conference on User Modeling Adaptation and Personalization. 2016 (Year: 2016).*

Pradhan, Swadhin, et al. "Understanding and managing notifications." IEEE INFOCOM 2017-IEEE Conference on Computer Communications. IEEE, 2017 (Year: 2017).*

Sarikaya, Ruhi. "The technology behind personal digital assistants: An overview of the system architecture and key components." IEEE Signal Processing Magazine 34.1 (2017): 67-81 (Year: 2017).*

Burgess, Brian, "Amazon Echo Tip: Enable the Wake Up Sound", Available online at: https://www.groovypost.com/howto/amazon-echo-tip-enable-wake-up-sound/, Jun. 30, 2015, 4 pages.

Lewis, Cameron, "Task Ave for iPhone Review", Mac Life, Available at: <http://www.maclife.com/article/reviews/task_ave_iphone_review>, Mar. 3, 2011, 5 pages.

Spivack, Nova, "Sneak Preview of Siri—Part Two—Technical Foundations—Interview with Tom Gruber, CTO of Siri", I Twine, Available at: URL: https://web.archive.org/web/20100114234454/http://www.twine.com/item/12vhy39k4-22m/interview-with-tom-gruber-of-siri, Jan. 14, 2010, 5 pages.

Amazon Alexa, "Getting your news with Alexa flash briefing", Online available at: https://www.youtube.com/watch?v=xui8rumrNaE, Sep. 9, 2019, 2 pages.

* cited by examiner

1000

Today

1004
Report_1 - 9 AM

Reminder: Upcoming Task
Buy Milk: Due Today @ 5 PM
1026

1006
Report_2 - Noon

1008
Report_3 - 3 PM

1010
Report_4 - 6PM

Reminder: Overdue Task
Buy Milk: Was Today @ 5PM
1036

1012
Report_5 - 9 PM

Tomorrow

1014
Report_6 - 9 AM

*FIG. 10A*

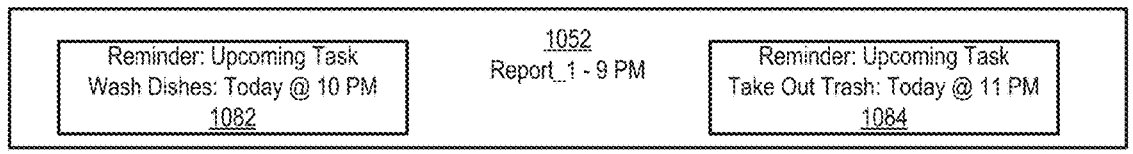

Yesterday

---

Today

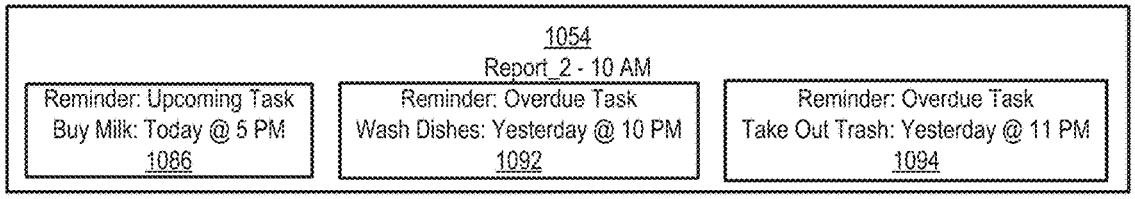

```
                    1056
              Report_3 - Noon
```

```
                    1058
              Report_4 - 3 PM
        ┌─────────────────────────────┐
        │  Reminder: Upcoming Task    │
        │ NEW Task: Send UPS Package: Today @ 8 PM │
        │           1088              │
        └─────────────────────────────┘
```

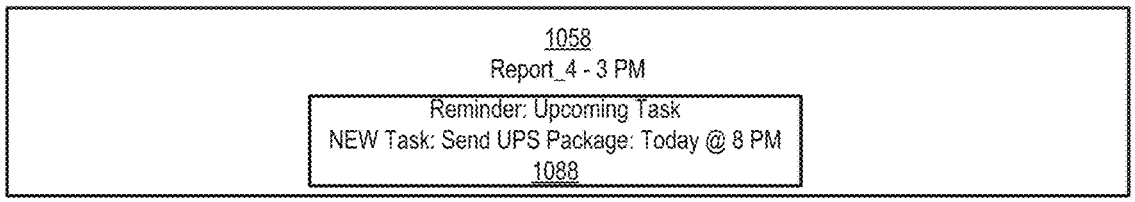

```
                    1062
              Report 6 - 9 PM
        ┌─────────────────────────────┐
        │   Reminder: Overdue Task    │
        │ Send UPS Package: Today @ 8 PM │
        │           1098              │
        └─────────────────────────────┘
```

---

Tomorrow

```
                    1064
              Report_7 - 10 AM
```

*FIG. 10B*

DIGITAL ASSISTANT-ENABLED DAILY BRIEFINGS

CROSS-REFERENCE TO RELATED APPLICATIONS

This application claims priority to U.S. Provisional Patent Application No. 63/078,197, entitled "DIGITAL ASSISTANT-ENABLED DAILY BRIEFINGS," filed Sep. 14, 2020, the contents of which is hereby incorporated by reference for all purposes.

FIELD

This relates generally to intelligent automated assistants and, more specifically, to operating a digital assistant to generate and provide reports targeted to a user.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

SUMMARY

Systems, methods, and electronic devices for operating a digital assistant and providing digital assistant-enabled briefings or reports are provided.

Example methods are disclosed herein. An example method for operating a digital assistant includes: in accordance with receiving a signal at an electronic device and at a current time. The signal may be an audio signal that encodes a spoken request for a current report targeted to a user that spoke the request. In other embodiments, the signal may include another type of user-generated signal, or a signal from a scheduling service that requests the current report. One or more processors and a memory of the electronic device are employed to perform operations. The operations may include identifying, from a plurality of tasks associated with the user, a set of incomplete tasks. Each task in the set of incomplete tasks may have a task-due timestamp and a reported status that indicates whether the task has been associated with a previous report targeted to the user. When the task has been associated with the previous report, the reported status may further indicate a reported timestamp associated with the previous report. The operations may further include generating a set of upcoming tasks. The set of upcoming tasks may be a first subset of the set of incomplete tasks. The task-due timestamp, of each task in the set of upcoming tasks, may be subsequent to the current time. The operations may further include generating a set of overdue tasks. The set of overdue tasks may be a second subset of the set of incomplete tasks. The task-due timestamp, of each task in the set of overdue tasks, may be previous to the current time. The operations may further include generating a set of to-be-reported tasks, via one or more filtering criteria applied to the reported status of each task included in the set of upcoming tasks and each task included in the set of overdue tasks. The operations may further include providing the current report to the user. The current report may include a reminder for at least a portion of the tasks included in the set of to-be-reported tasks.

Example non-transitory computer-readable storage mediums are disclosed herein. An example non-transitory computer-readable storage medium stores one or more programs. The one or more programs comprise instructions, which when executed by one or more processors of an electronic device, operate a digital assistant, by performing actions. The actions may include identifying, from a plurality of tasks associated with the user, a set of incomplete tasks. Each task in the set of incomplete tasks may have a task-due timestamp and a reported status that indicates whether the task has been associated with a previous report targeted to the user. When the task has been associated with the previous report, the reported status may further indicate a reported timestamp associated with the previous report. The actions may further include generating a set of upcoming tasks. The set of upcoming tasks may be a first subset of the set of incomplete tasks. The task-due timestamp, of each task in the set of upcoming tasks, may be subsequent to the current time. The actions may further include generating a set of overdue tasks. The set of overdue tasks may be a second subset of the set of incomplete tasks. The task-due timestamp, of each task in the set of overdue tasks, may be previous to the current time. The actions may further include generating a set of to-be-reported tasks, via one or more filtering criteria applied to the reported status of each task included in the set of upcoming tasks and each task included in the set of overdue tasks. The actions may further include providing the current report to the user. The current report may include a reminder for at least a portion of the tasks included in the set of to-be-reported tasks.

Example electronic devices are disclosed herein. An example electronic device comprises one or more processors; a memory; and one or more programs, where the one or more programs are stored in the memory and configured to be executed by the one or more processors, the one or more programs including instructions for actions. The actions may include identifying, from a plurality of tasks associated with the user, a set of incomplete tasks. Each task in the set of incomplete tasks may have a task-due timestamp and a reported status that indicates whether the task has been associated with a previous report targeted to the user. When the task has been associated with the previous report, the reported status may further indicate a reported timestamp associated with the previous report. The actions may further include generating a set of upcoming tasks. The set of upcoming tasks may be a first subset of the set of incomplete tasks. The task-due timestamp, of each task in the set of upcoming tasks, may be subsequent to the current time. The actions may further include generating a set of overdue tasks. The set of overdue tasks may be a second subset of the set of incomplete tasks. The task-due timestamp, of each task in the set of overdue tasks, may be previous to the current time. The actions may further include generating a set of to-be-reported tasks, via one or more filtering criteria applied to the reported status of each task included in the set of upcoming tasks and each task included in the set of overdue tasks. The actions may further include providing the current report to the user. The current report may include a reminder for at least a portion of the tasks included in the set of to-be-reported tasks.

BRIEF DESCRIPTION OF THE DRAWINGS

FIGS. 10A-10B illustrate non-limiting examples of identifying incomplete tasks to include in various briefings based on whether the tasks have been previously reported in other briefings.

DETAILED DESCRIPTION

Figure 1:
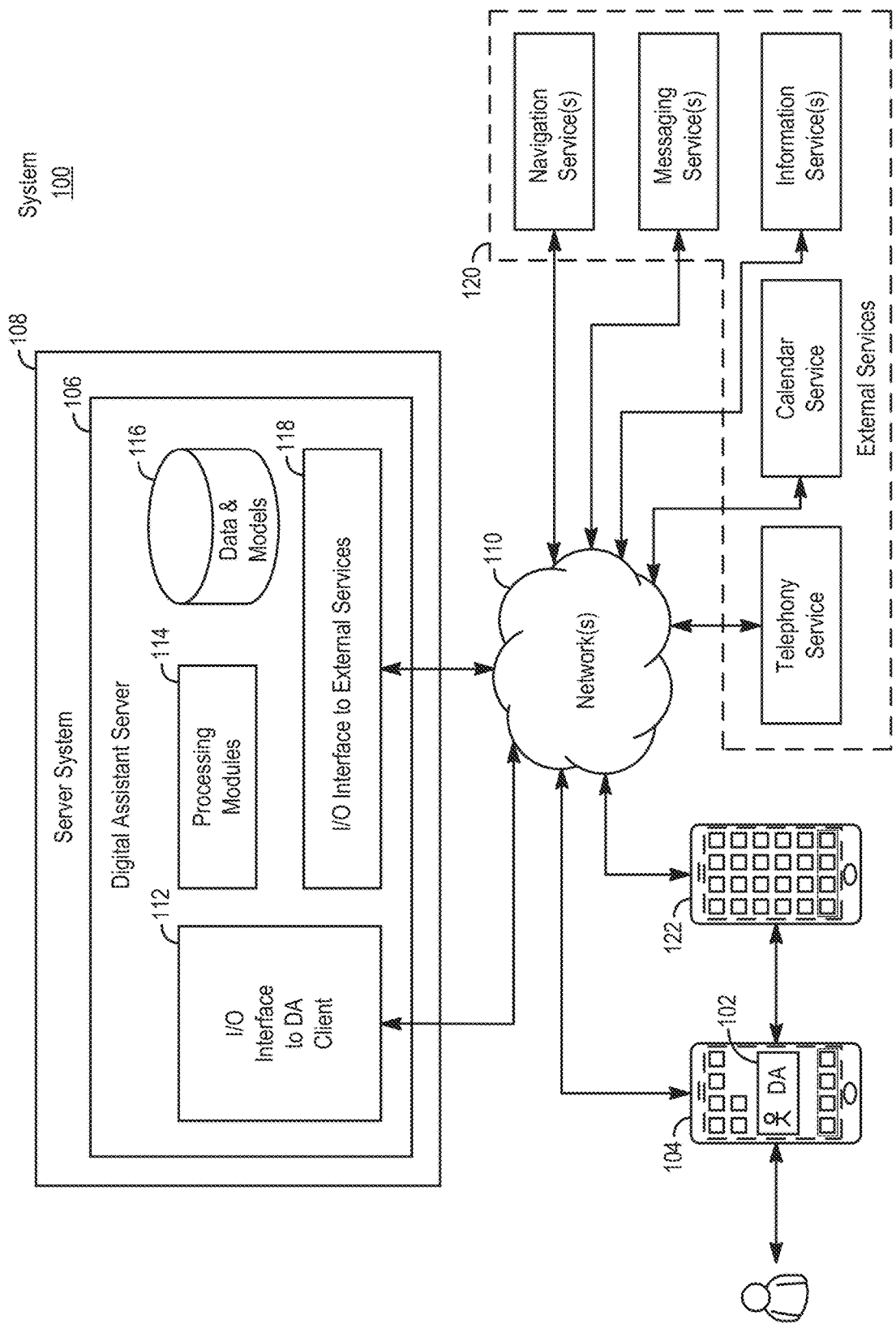
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

The various embodiments include employing one or more digital assistants executing on and/or implemented by one or more electronic devices to generate and provide a report, which is tailored and/or targeted to a specific user that requested the report. The contents of the report may include current information that is of interest and/or relevant to the user. Such information may include, but is not otherwise limited to reminders for upcoming and/or overdue user associated action items (e.g., tasks included in a to-do list or reminder application), events (e.g., prioritized calendar items, appointments, and/or meetings), travel information (e.g., traffic data associated with travel to a calendar item and/or a commute to work), weather information (e.g., a weather report for the user's current location and/or future destination if the user is traveling soon), current events (e.g., news headlines), financial events (e.g., stock market reports), crowd-sourced online activities (trending topics on social networks or search-query trends), and the like. Because such information may be relevant for planning purposes regarding the user's upcoming day (e.g., the user's morning, afternoon, and/or evening), the report may be referred to as a "daily briefing," or simply a "briefing" targeted to the user.

The reports may be provided as an on-demand service, e.g., the user may request a report, and in response to the on-demand request, the report may be generated and provided in real-time (or at least in near rear time). The user may request an on-demand report via a verbal (e.g., spoken) command, or any other suitable input mechanisms which enables a user to provide a request for a service. Alternatively, or in combination to the on-demand service, reports may be provided via a scheduling service (e.g., a cron job and/or task scheduler). For example, the reports may be provided in accordance to one or more (user configurable) frequencies, or the user may schedule one or more times in their day to receive a report.

As an example of an on-demand request for a report, the user may verbally request that the digital assistant provide the report, one or more times throughout the day. In one embodiment, the user may request an on-demand report by speaking "Hey Digital Assistant, what is my briefing," at some point in their day (e.g., upon waking up, after lunch, during their evening, and/or any other time during their day). The digital assistant may respond by providing natural language encodings (e.g., spoken or text-based) of indications of information included in the report. The digital assistant may employ a natural language-based verbal and/or spoken interface for receiving requests and providing the requested report. For example, the digital assistant may respond to the user's request by speaking, "Good morning user, today's weather for your city is mostly sunny with a high of 92 degrees Fahrenheit." That is, the digital assistant may provide an audible dictation of a summary of the daily weather report (or the entire report) for the user's current location. The digital assistant may proceed with providing (audible, textual, and/or graphic-based) indications of one or more of the following: one or more upcoming and/or prioritized events from one or more electronic calendars associated with the user, traffic reports, reminders for the user's upcoming and/or overdue tasks, and news updates. The user may make an on-demand request for the report multiple times throughout their day. In response to each request, the digital assistant may continue to generate and provide a new and/or updated report, where the report is updated and/or tailored based on the time of day that the report was requested and any available updated information to include in the report.

For example, after the user forget to buy milk at 5 PM, the user may request another briefing at 7 PM. In contrast to the report provided at 4 PM (when the task to buy milk at 5 PM was an upcoming task), the report provided at 7 PM may include a reminder indicating that the task of buying milk is still incomplete and now overdue. Again, so as to not burden the user with already known information, the reminder of the overdue task may be provided only once in a single report. That is, if the user requests another report at 9 PM that day, a reminder to buy milk may not be included in the 9 PM report, because a reminder of the overdue task was included in the previous report provided at 7 PM (after the upcoming task has become an overdue task). In at least one embodiment, the reminder of an overdue task may only be included in a report during the next calendar day. For instance, rather than providing the overdue task reminder to buy milk in the 7 PM report of that day, the digital assistant may wait to provide the reminder until the first report of the next day (e.g., a report requested after the user wakes up the next morning).

In order to not over-report information, or otherwise burden the user with information they may already be aware of, the information reported in a brief may be intelligently filtered, or otherwise determined, selected, and/or identified, such as to not include redundant, or previously reported, information. For instance, a user may request an on-demand report or briefing at 4 PM. A previously provided report (e.g., a report provided to the user at 8 AM after the user woke up that day) may include a reminder that an upcoming task (e.g., "buy milk") is due at 5 PM today. Because the reminder to buy milk at 5 PM was previously reported, the current report provided at 4 PM may not include the reminder. If a due time of the task (e.g., 5 PM) passes without the task being completed, a classification (or status) of the task may switch from an upcoming task to an overdue task. Once the status of the task has switched to classify the task as an overdue task, a reminder for the overdue task may again be reported in another briefing provided either the day that the task was due and/or a day subsequent to the day that the task was due. That is, once the task has become an overdue task, a reminder of the overdue task may be included in one or more subsequent reports.

In some embodiments, the absolute number of times, or alternatively a relative (temporal or report) frequency, that particular information is included in a report (or brief) may be dependent on one or more classifications, types, and/or features of the particular information and/or one or more user configurations. As an example of information being included in reports based on a number of times, a task reminder may be provided in a report or brief once, twice, or more depending on the scenario. As an example of information being included in multiple reports based on a temporal frequency, the task reminder may be included in reports twice a day, once a day, every other day, or the like, at least within a temporal period of relevancy to the user. In an example of information being included in multiple reports based on a report frequency, the task reminder may be included in every report, every second report, every third report, or the like, at least within the temporal period of relevancy. As a non-limiting example, a reminder for a particular upcoming task may first be reported in a first briefing (or report) of the day that the task is due. If the task is not completed by the due time, the upcoming task may be reclassified an overdue task. Another reminder for the now overdue task may be provided once again in a subsequent report (e.g., either another report that day, or a report provided the next day).

In other embodiments, other intelligent filtering criteria may be applied to the information. In some embodiments, previously reported information may be included in a current report if a predefined amount of time has passed since it was last reported, or alternatively, if a predefined number of briefings have been provided since the information was previously reported. The user may be enabled to configure one or more characteristic frequencies (e.g., defined with respect to either temporal periods or number of intervening reports) that indicate whether to include previously reported information in a current report based on one or more classifications, types, and/or features of the information.

The information to include in a report, or briefing, may be collected and aggregated from various information sources, or services, that the digital assistant has access. For example, the digital assistant may consult one or more electronic calendars associated with the user, a reminder (or to-do list) application, a weather service, a traffic service, one or more news sources (e.g., textual and/or audio-based news aggregators or newsfeeds), a location service (e.g., a geolocation and/or GPS application), one or more social network applications, one or more search engine applications, one or more podcast and/or video feeds, streams, or pipelines, and the like. The information may be sourced via one or more applications installed locally on the electronic device that is implementing the digital assistant. In some embodiments, the digital assistant may request at least a portion of the information from various online resources, such as but not limited to websites, distributed cloud-based services, online databases, repositories, libraries, encyclopedias, archives, a corpus, and the like. The digital assistant may intelligently aggregate, filter, structure, and/or repackage the information to generate a report, in a format, that is consistent with the user's preferences.

It is understood that in some embodiments, more or less filtering of the information included in a report may be performed. In some embodiments, little if any filtering is performed. In at least one embodiment, information previously reported may be re-reported in a current and/or future report. In the example above for the reminder to buy milk, the reminder may be included in each report of the day that the task was due, until the task is completed. In such embodiments, the tasks may still be transitioned from an upcoming task to an overdue task, but the user may be given a reminder regarding the task, in each report provided within the temporal period of relevancy (e.g., the day that the task is due). As noted above, the user may be enabled to configure the filtering criteria for each section of a report.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
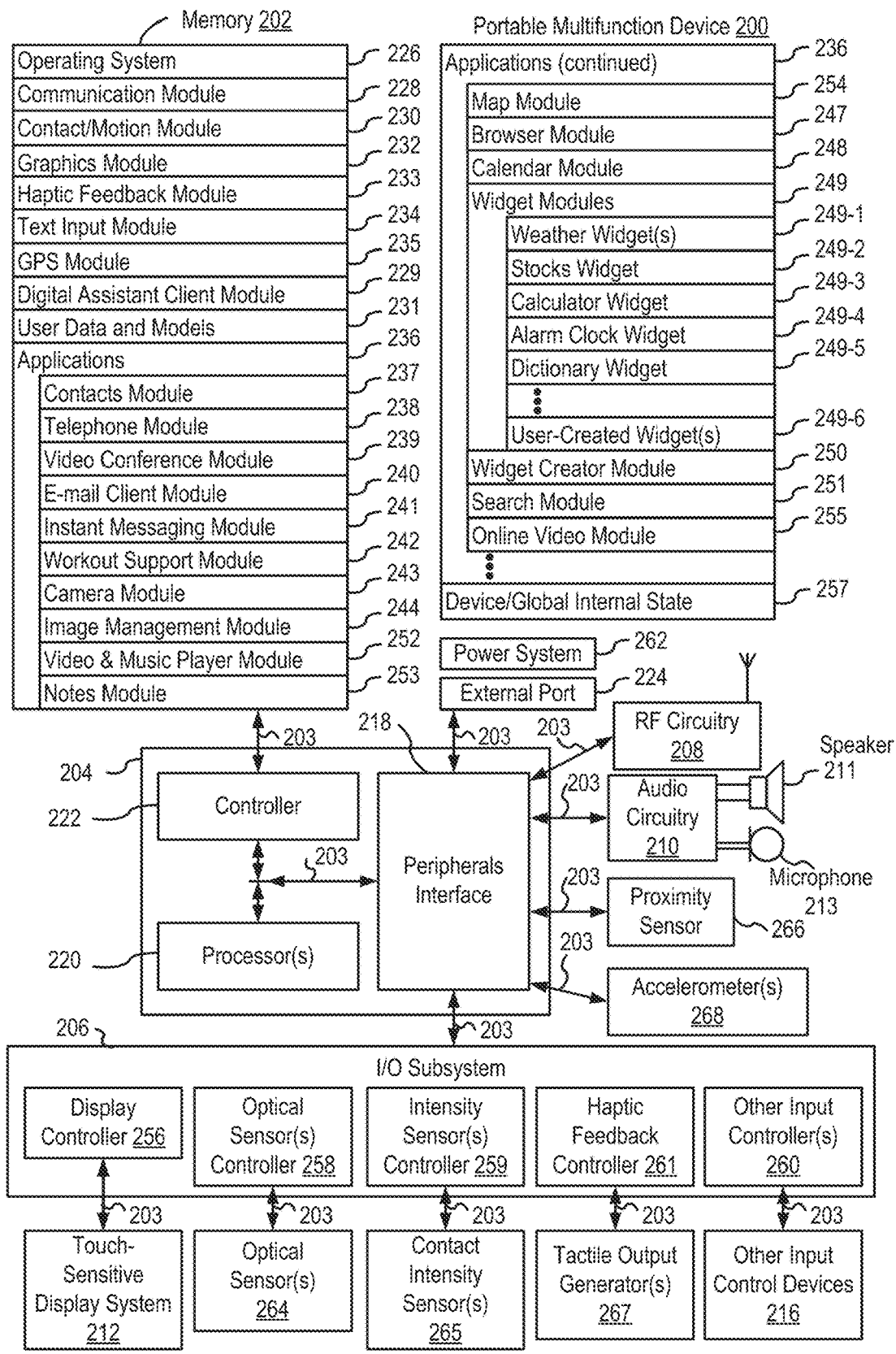
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth.

In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
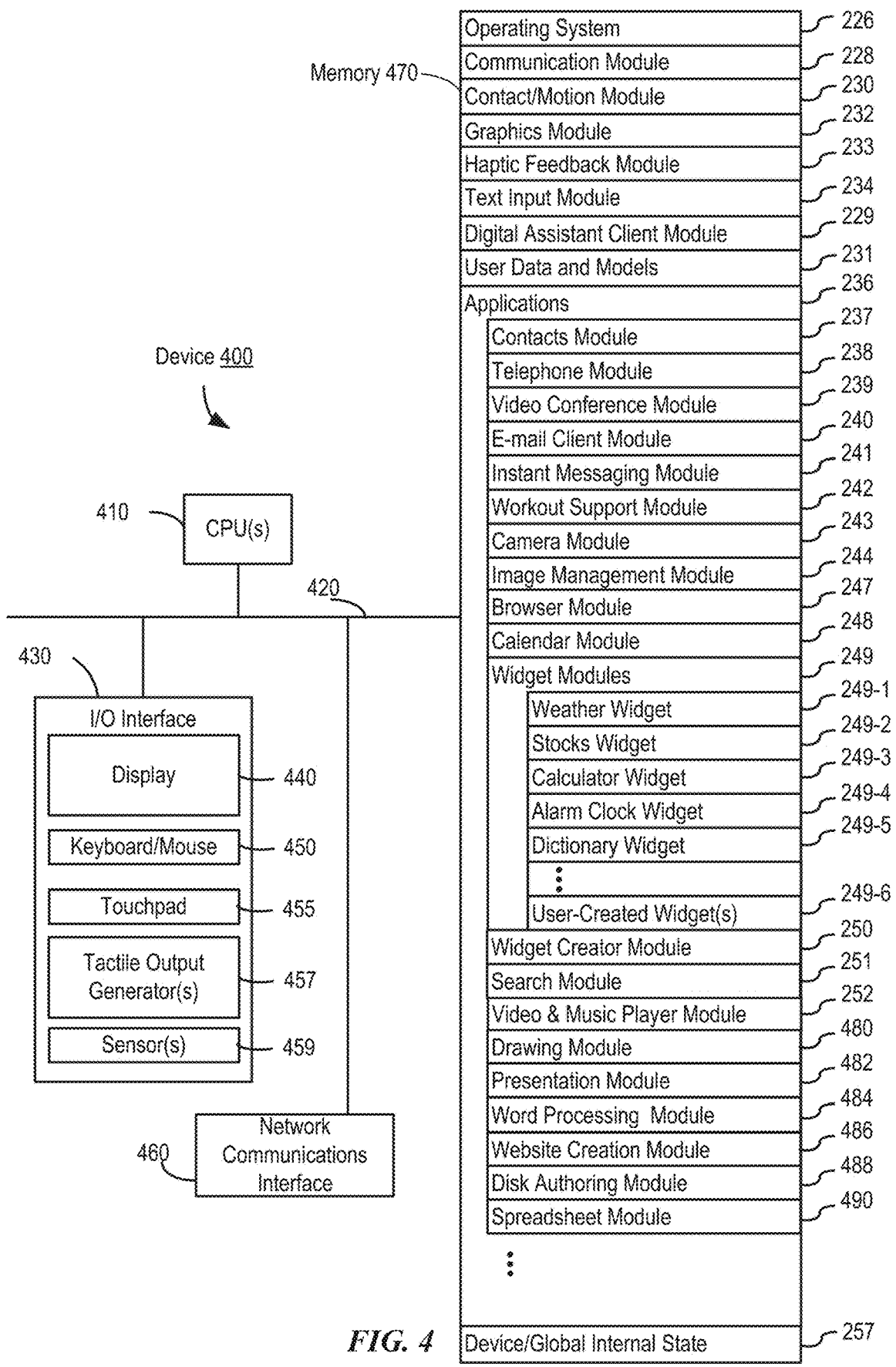
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;

Image management module 244;
Video player module;
Music player module;
Browser module 247;
Calendar module 248;
Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
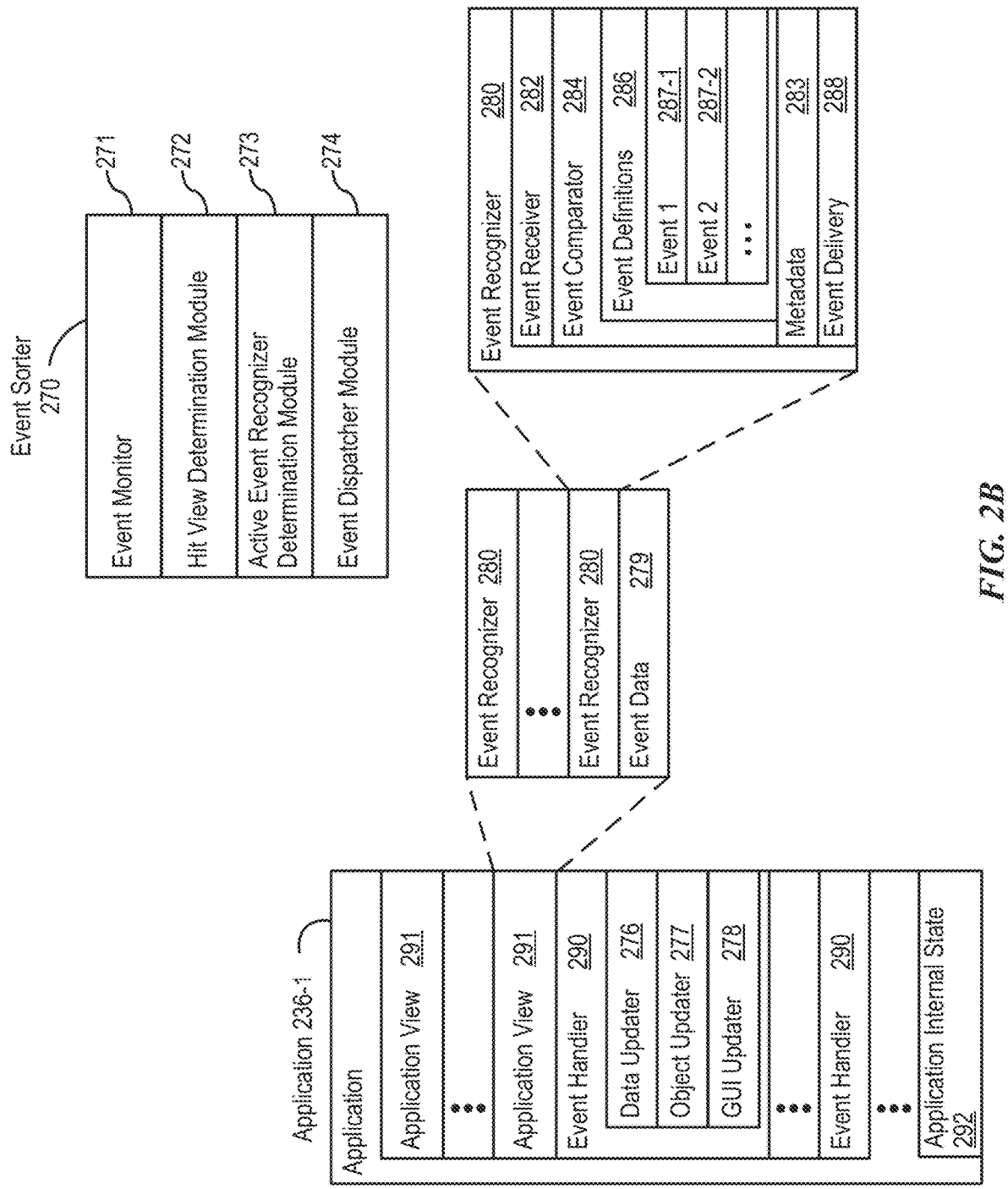
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
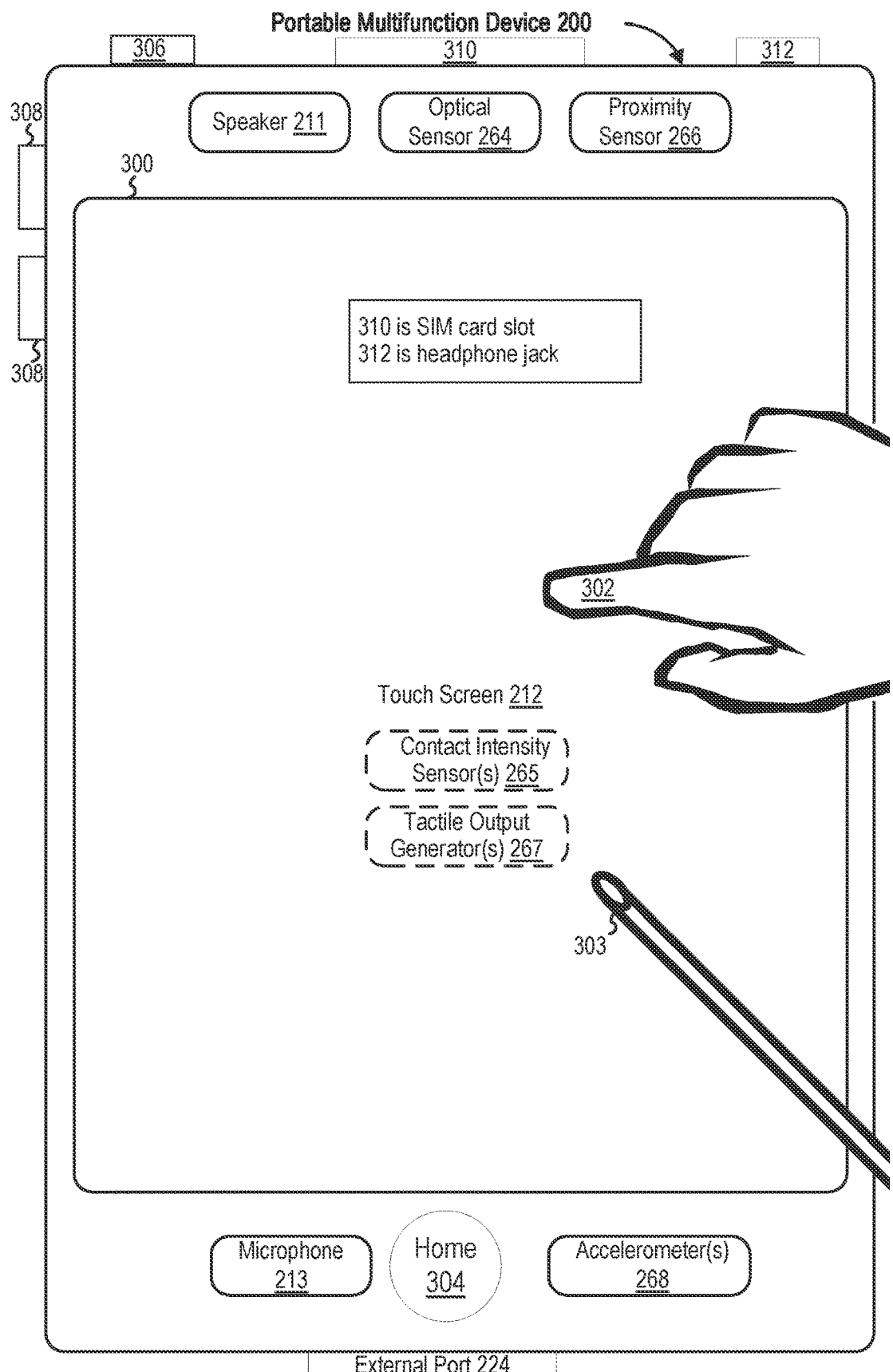
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
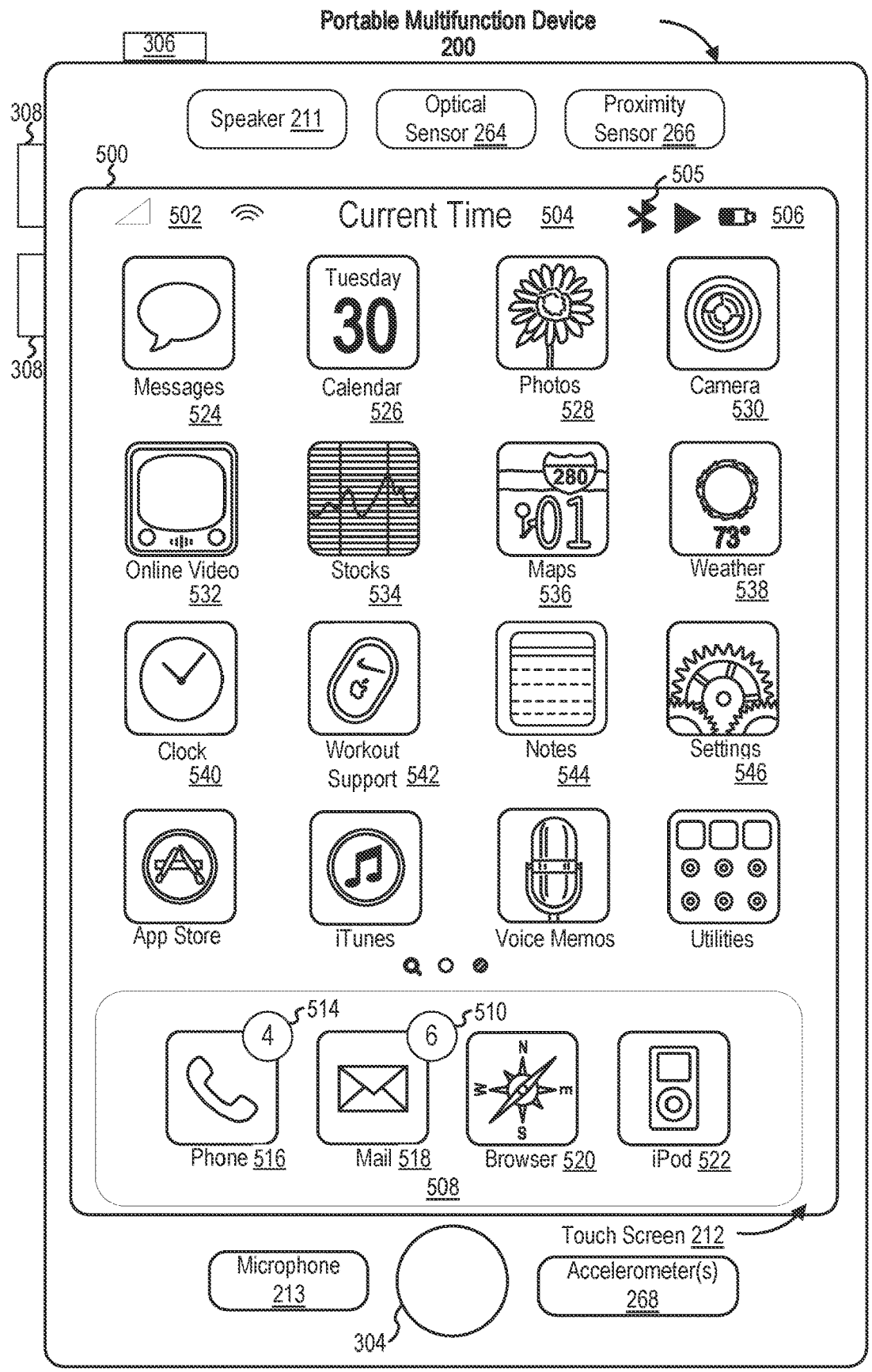
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
    Icon 516 for telephone module 238, labeled "Phone," which optionally includes an indicator 514 of the number of missed calls or voicemail messages;
    Icon 518 for e-mail client module 240, labeled "Mail," which optionally includes an indicator 510 of the number of unread e-mails;
    Icon 520 for browser module 247, labeled "Browser;" and
    Icon 522 for video and music player module 252, also referred to as iPod (trademark of Apple Inc.) module 252, labeled "iPod;" and
Icons for other applications, such as:
    Icon 524 for IM module 241, labeled "Messages;"
    Icon 526 for calendar module 248, labeled "Calendar;"
    Icon 528 for image management module 244, labeled "Photos;"
    Icon 530 for camera module 243, labeled "Camera;"
    Icon 532 for online video module 255, labeled "Online Video;"
    Icon 534 for stocks widget 249-2, labeled "Stocks;"
    Icon 536 for map module 254, labeled "Maps;"
    Icon 538 for weather widget 249-1, labeled "Weather;"
    Icon 540 for alarm clock widget 249-4, labeled "Clock;"
    Icon 542 for workout support module 242, labeled "Workout Support;"
    Icon 544 for notes module 253, labeled "Notes;" and
    Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
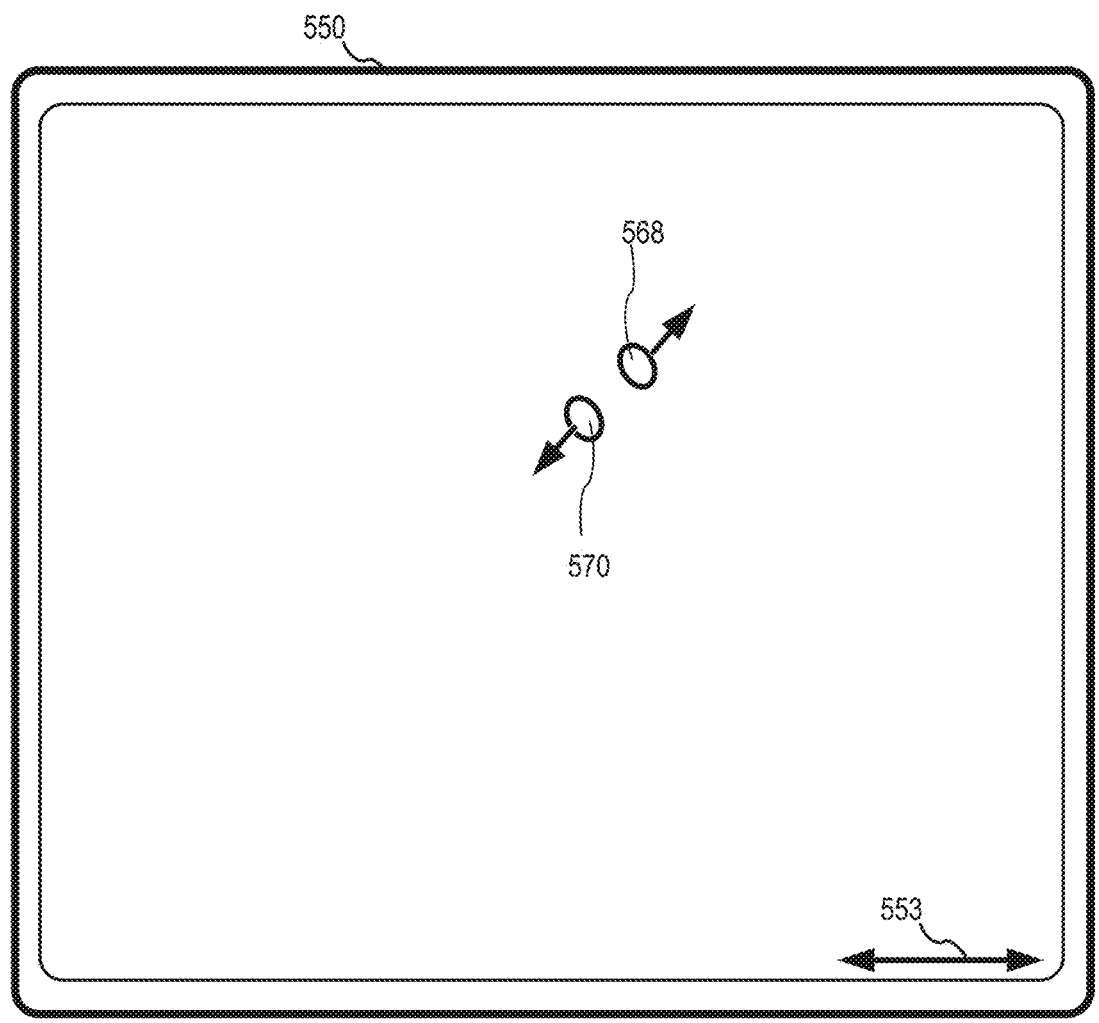
FIG. 5B illustrates an exemplary user interface for a multifunction device with a touch-sensitive surface that is separate from the display, according to various examples.
Figure 5B:
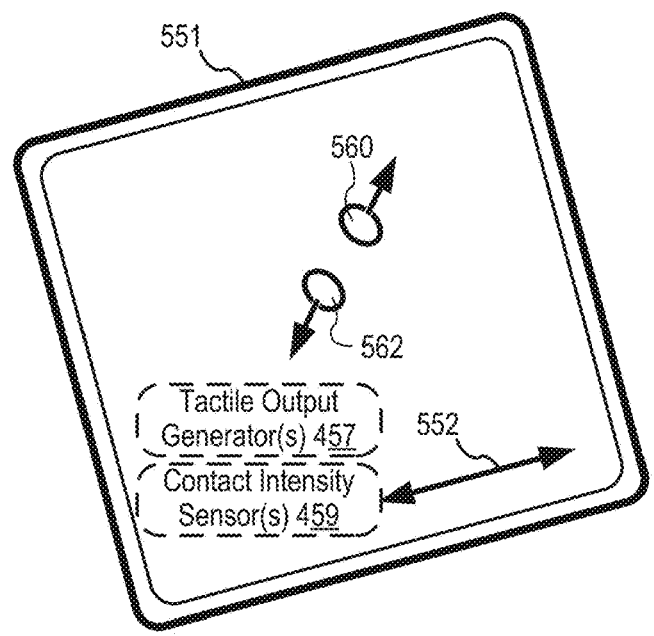

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
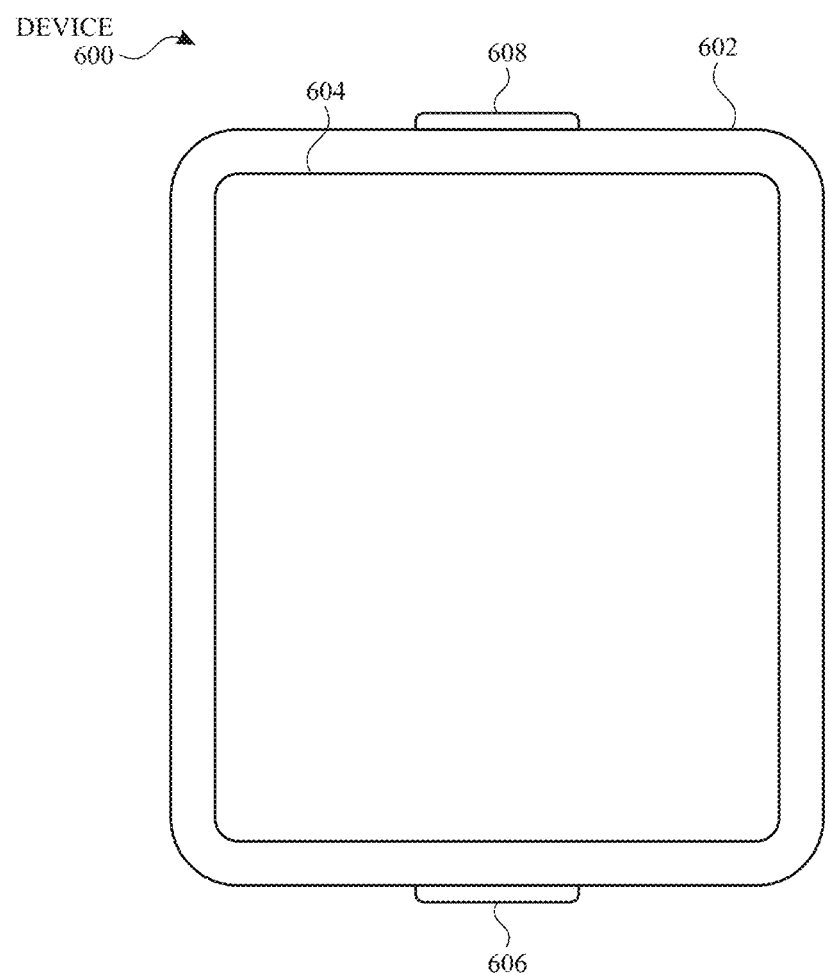
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
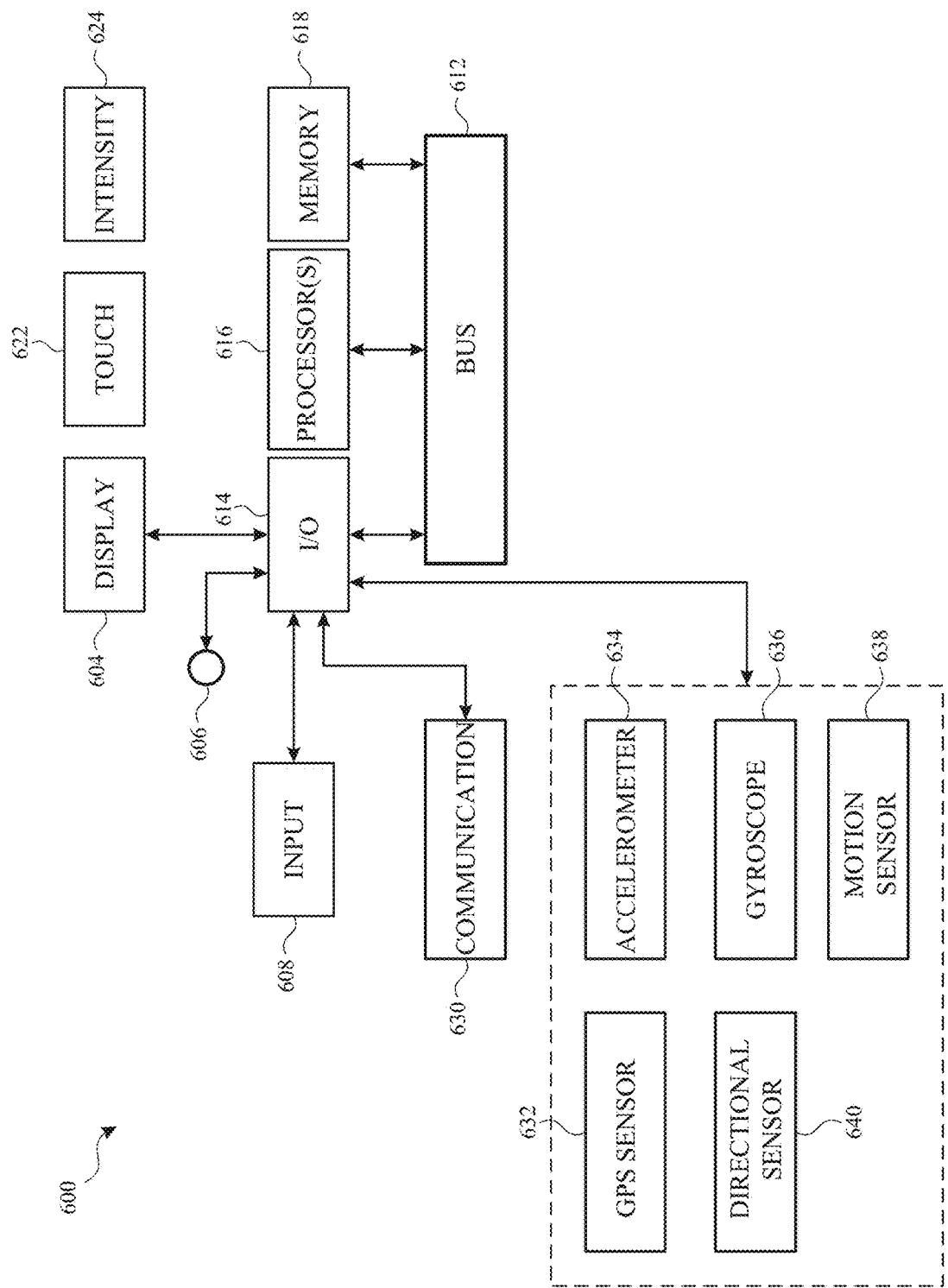
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
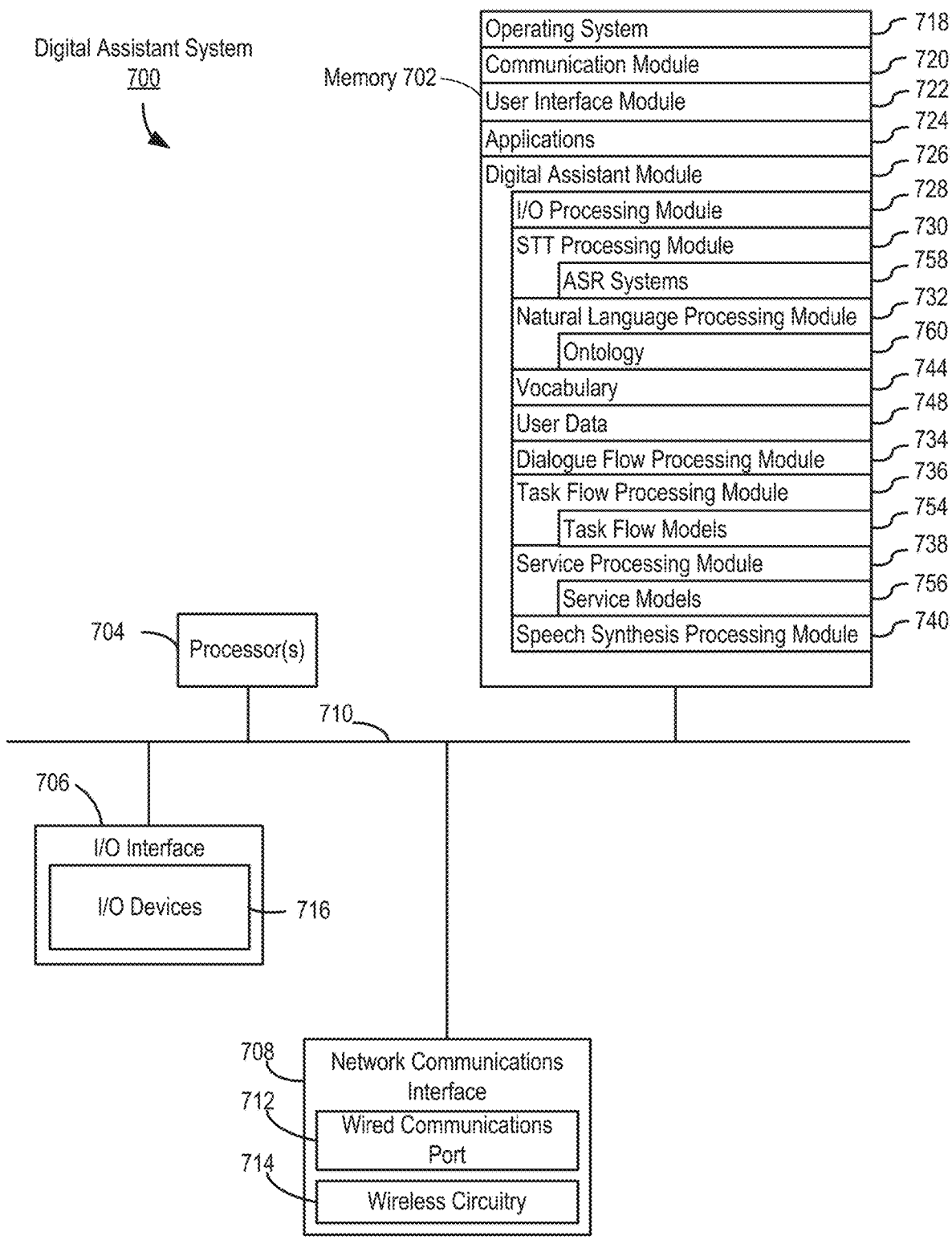
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
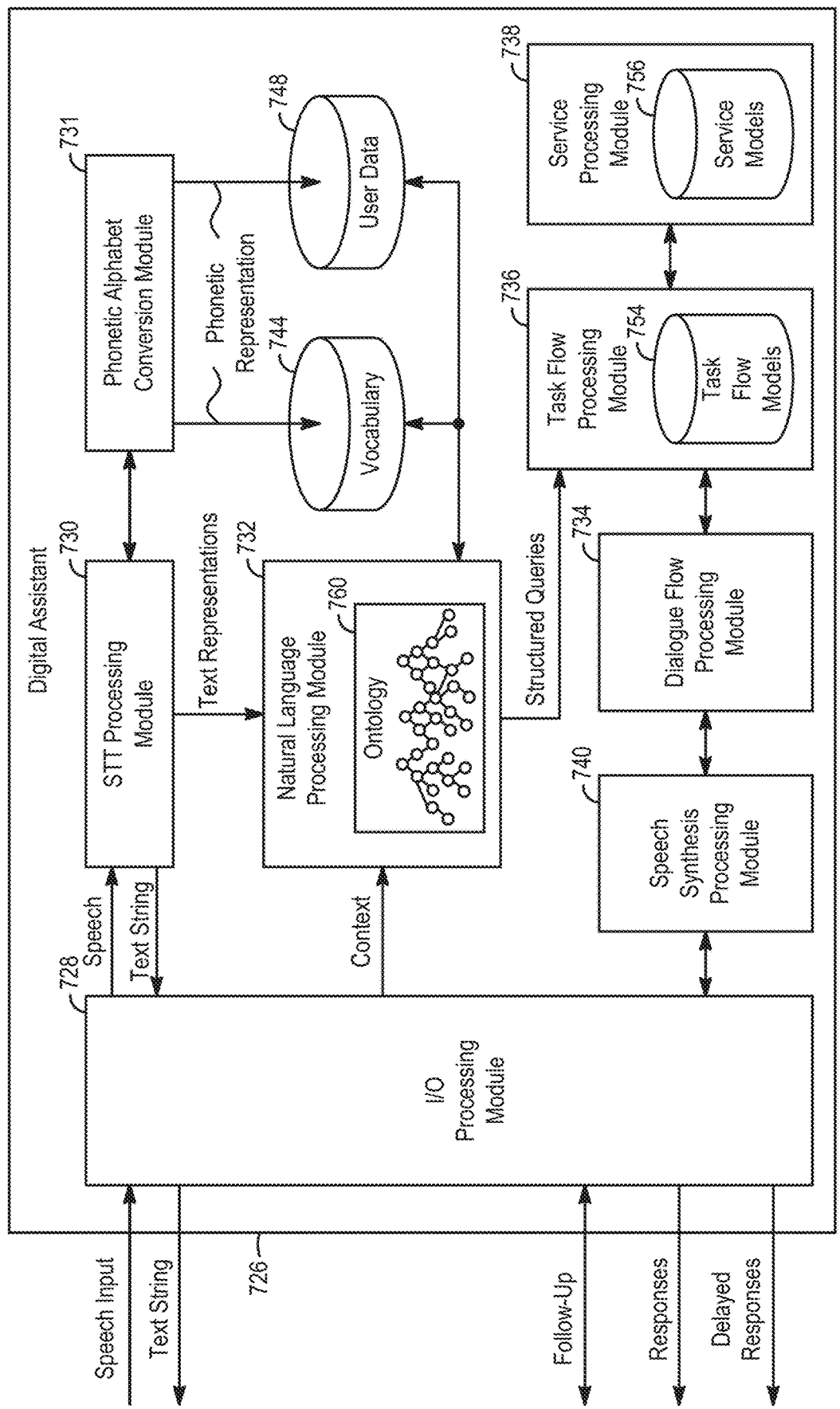
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /təˈmeɪɾoʊ/ and /təˈmɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /təˈmeɪɾoʊ/ is ranked higher than /təˈmɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /təˈmeɪɾoʊ/ is associated with the United States, whereas the candidate pronunciation /təˈmɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪɾoʊ/ (associated with the United States) is ranked higher than the candidate pronunciation /təˈmɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /təˈmeɪɾoʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /təˈmeɪɾoʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
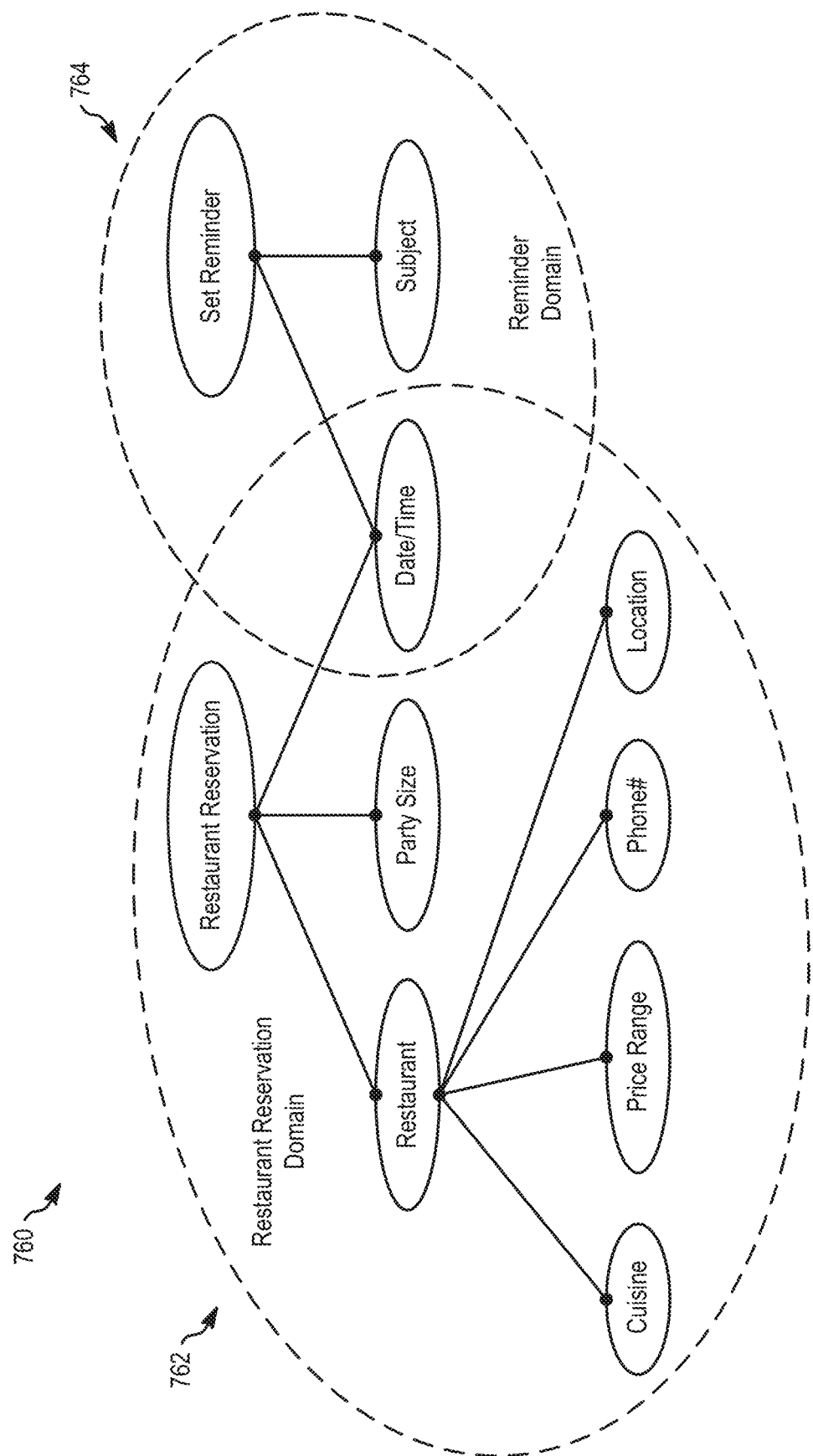
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Daily Briefing Service

Figure 8:
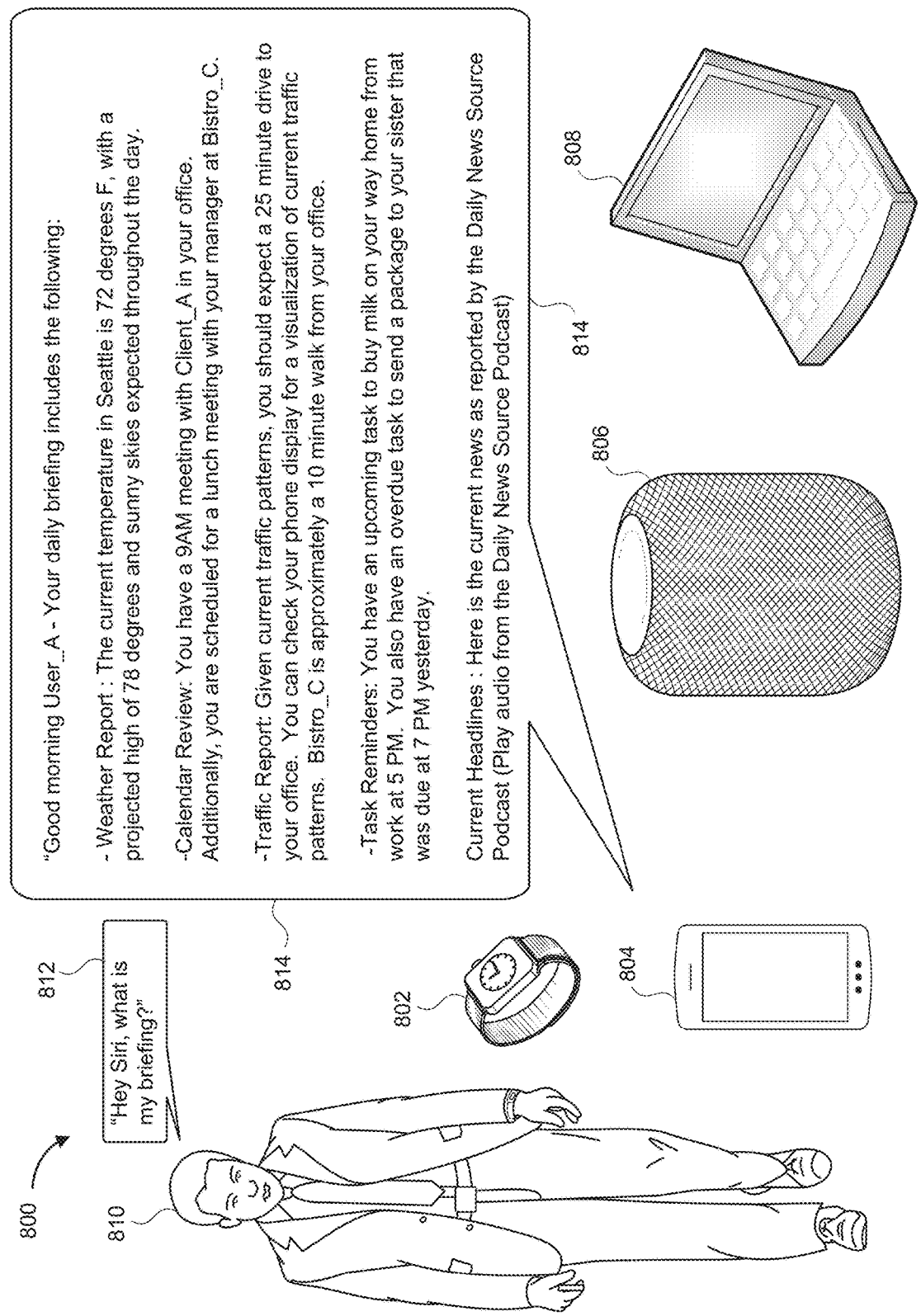
FIG. 8 illustrates a digital assistant-enabled daily briefing environment, according to various embodiments.

FIG. 8 illustrates a digital assistant-enabled daily briefing environment 800, according to various embodiments. Environment 800 may include one or more electronic devices, such as but not limited to a smartwatch 802, a smartphone (and/or tablet device) 804, a smartspeaker 806, a laptop device 808, and the like. One or more of such devices 802-808 may be collectively referred to, interchangeably, as electronic devices, computing devices, devices, computers, or the like. Each of the devices 802-808 may be enabled to implement one or more instances of a digital assistant (which may be interchangeably referred to as a virtual assistant). One or more instances of a digital assistant may be enabled to provide any of the daily briefing (or reporting) embodiments and/or functionalities discussed herein. FIG. 8 is not intended to be exhaustive, and other computing devices not shown in FIG. 8 (desktop computing devices, virtual reality (VR) devices, augmented reality (AR)

devices, and the like) may be included in environment 800 and/or may implement a digital assistant that provides such daily briefing services.

User 810 may request an on-demand briefing (or report) via speaking a command that the digital assistant interprets and/or compiles as a machine instruction for a request for a current report. For example, in embodiments where the digital assistant is referred to as and/or triggered by the trigger phrase: "Hey Siri," user 810 may speak the trigger phrase "Hey Siri, what is my briefing," as indicated by the user's dialogue bubble 812. In other embodiments, any other such trigger phrase that is interpretable as a request for a current report (or briefing) may be verbally spoken by user 810. In still other embodiments, user 810 may provide a request for a report via other command-selecting mechanisms, such as but not limited to a typing a command, a swiping gesture, a click, a drag and/or drop operation, eye gaze (e.g., with a device that tracks a user's gaze), and the like. The request for the report may be received by at least one of the devices 802-808. In response to receiving the request, a digital assistant implemented by at least one of the receiving devices 802-808 may generate and provide a report. The report includes content (e.g., information and/or data). In some embodiments, that dialogue is text-based. In other embodiments, the content of the report may be included and/or encoded in verbally spoken dialogue. The spoken dialogue may be emitted by a speaker device of one the devices 802-808, which is implementing the digital assistant, as indicated in content bubble 814. A non-limiting, but exemplary embodiment of such dialogue encoding the contents of a report are shown in the device dialogue bubble 814. It should be noted that the content of the report may vary in the embodiments, and the content shown in dialogue bubble 814 of FIG. 8 is only for exemplary purposes. In embodiments where the user 810 requests a report, and in response, a digital assistant generates and provides the requested report may be referred to as on-demand embodiments. In other embodiments, a report may be automatically generated and provided at preset and/or predetermined times or intervals via one or more report scheduling services provided by the digital assistant. Such embodiments may be referred to as scheduling embodiments.

The report may include information, such as but is not otherwise limited to reminders for upcoming and/or overdue user associated action items (e.g., tasks included in a to-do list), events (e.g., prioritized calendar items, appointments, and/or meetings), travel information (e.g., traffic data associated with travel to a calendar item and/or a commute to work), weather information (e.g., a weather report for the user's current location and/or destination if the user is traveling soon), current events (e.g., news headlines), financial events (e.g., stock market reports), crowd-sourced online activities (trending topics on social networks or search-query trends), and the like. The dialogue may include verbalizations and/or spoken indicators of such information. The dialogue may also include a greeting tailored to the requesting user.

The report's content (e.g., dialogue) may be subdivided into a set of dialogue portions (or dialogue sections), where each dialogue section corresponds to a topic, section, or portion of the report. That is, a particular dialogue portion (or section) includes dialogue representing the information for the corresponding topic of the particular dialogue portion. In FIG. 8, the report includes six separate topics and/or sections: a greeting (or welcome) section, a weather report section, a calendar review section, a traffic report section, a task reminder section, and a current headlines (or "news") section. Such sections are not limiting for a report and/or report dialogue, and other embodiments may include more or less report and/or dialogue sections. A report may include other sections, such as but not limited to sections related to various social network feeds, financial events, online activity trends, and the like.

The information to include in each report section (or the dialogue section corresponding to the report section) may be collected and aggregated from various information sources, applications, or services, that the digital assistant has access. For instance, the weather information to include in the report may be accessed and/or gathered from one or more electronically available weather services, applications, or other online weather resources. The weather information may be tailored to a user's current geolocation and/or a location that the user is expected to travel to within the near future. The user's current location may be determined via one or more location services (e.g., a GPS application and/or service that at least one of devices 802-808 have current access to). A location that the user us expected to travel to in the near future may be automatically determined via calendar information obtained from one or more calendar services (e.g., an electronic calendar associated with the user that includes a travel entry), a travel booking service (e.g., an online travel booking website or application), or the like. In some embodiments, a user may manually provide expected travel plans to the digital assistant.

The calendar information to include in a report may be accessed and/or gathered via one or more electronic calendar services, applications, or the like. Likewise, the traffic information to include in a report may accessed and/or gathered from one or more electronically accessible traffic report services, applications, websites, and the like. The traffic information to access may be based on calendar information, the user's current geolocation, a location that the user is expected to travel to, and the like. For instance, the traffic information may include traffic relating the user's work commute, travel to a meeting and/or event included in the user's calendar, the user's current location and the user's expected future location, and the like. In at least one embodiment, the traffic information is associated with one or more calendar events (e.g., a scheduled meeting or appointment), the user's current location (e.g., the user's residence), the user's expected future location (e.g., the location of the user's employment, a location associated with a calendar event, the user's travel schedule), or other such factors. The task reminder information may be accessed and/or gathered from an electronically accessible task and/or to-do list service, application, website, or the like. The current headlines (or news) information may be accessed and/or gathered from one or more online news services, applications, aggregators, websites, and the like. The news information may include audio information, such as but not limited to one or more podcast feeds that the digital assistant has access to. This list of information resources is not intended to be exhaustive, and any other accessible information resource may be a source of information to include in a report.

In on-demand embodiments, in response to receiving a request for a report, the digital assistant may gather and/or access information (in real-time or at least near real-time) that is relevant to the various report sections. In the exemplary embodiment of FIG. 8, each of weather information (or weather data), calendar information (or calendar data), traffic information (or traffic data) task information (or task data), and current events information (or current events data) may be accessed and/or gathered from various services, applications, or other such electronically available information resources. When gathering information for each of the report sections, each report section may be associated with one or more temporal periods of relevancy. A temporal (or time) period of relevancy for a report section may refer to the temporal period for which information associated with the section is relevant to the user and/or report. The temporal period of relevancy is a window (or block) of time that information (which may be associated to one or more points, windows, blocks, or periods of time via one or more timestamps associated with the information) is relevant to the user. In some embodiments information that is gathered to possibly include in a report should fall within the temporal period of relevancy. The temporal period of relevancy may be based on the time that the request for the report was received. The temporal period of relevancy may extend into a future period, block, or window of time from the time that the request was received. In some embodiments, and at least for some report sections, the temporal period of relevancy may extend into the past, with respect to the time that the request was received.

For example, when gathering information regarding incomplete tasks, a temporal period of relevancy may extend from a twenty four hour period prior to the time that the request was received and up to twenty four hours after the time that the request was received. In another example, a temporal period of relevancy for the calendar section of the report may extend from the time that the request was received to twelve hours after the time that the report was received. For each report section, the associated and/or corresponding temporal period of relevancy may be based and/or be dependent on the time of day that the request was received. For instance, if a request for a report is received in the morning hours, the temporal period of relevancy for the calendar report section may extend into the future for eight hours. In contrast, if the request was received in the evening hours, in order to make sure that at least some of tomorrow's calendar events are included in the report, the temporal period of relevancy for the calendar section may extend for eighteen hours into the future. Terms such as temporal period of relevancy, temporal window of relevancy, relevancy temporal period, relevancy temporal window, relevancy period, relevancy window, and the like may be used interchangeably within. In various embodiments, the temporal periods of relevancy for the various report sections may be configurable by the user, may be determined by one or more machine learning (ML) methods, may be programmable with default values, and the like.

Once the information has been gathered, the information may be intelligently filtered and/or selected to include in the report. In some embodiments, so as to not overburden the user with information that they may already be aware of because the information was already included in one or more previous reports, at least portions of the previously reported information may be filtered from the gathered information. For example, if an upcoming task has been reported in a previous report, the previously reported upcoming task may be filtered from the gathered task information, so as to not include it in the current report and overburden the user with previously reported tasks.

Another example of filtering information includes filtering calendar events from the gathered calendar information. The calendar information may include multiple calendar events for the user. So as to not overburden the user with excessive information, only a subset of the multiple calendar events may be included in the report. In one embodiment, and similar to the above task reminder example, including a particular calendar event in a current report may be based on whether or not the particular calendar events was included in a previous report, how many times the particular calendar event was reported in previous reports, the frequency of previously reporting the particular calendar event, whether the calendar event is upcoming or overdue, and the like. In other embodiments, the multiple calendar events may be ranked and/or sorted via one or more priority criteria. Including a particular event in the current report may be based on the events ranking and/or a priority score associated with the particular event. For instance, each calendar event of the multiple events may be associated with and/or assigned a priority score. In some embodiments, the calendar events may be filtered via the priority score, such that only a subset of the multiple events are included in the report. In some embodiments, the filtering of the calendar information may result in reporting a predetermined number of calendar events, a predetermined percentage of the number of calendar events, or any other such criteria. In the various embodiments, the filtering criteria for each of the report sections may be based on the day of the year that the report is request on, the time of day that the report was requested, the gathered information for the report section, the content of one or more previous reports, or the like.

After intelligently filtering the information, the report may be generated by curating the filtered information. Curating the filtered information may include generating the dialogue for each of the report sections. The dialogue for each report section may be based on employing one or more dialogue templates for the report section. A dialogue template may include a data structure that includes predefined dialogue (e.g., natural language paragraphs, paragraph fragments, sentences, sentence fragments, words, tokens, and the like), as well as key-value pairs embedded within the predefined dialogue. One or more values for a specific key may be determined from the information gathered or accessed for the corresponding report section. In addition to being based on the information for a section, a value for a particular key in a dialogue template may be determined via the request for the report, a user associated with the request, a context of the request and/or user, time of request, date of request, and the like. A dialogue template may be interchangeably referred to as a dialogue pattern.

For example, the dialogue template for the greetings section of the report may include "Good <temporal_period><user_id>—Your daily briefing includes the following:" The predefined dialogue in the exemplary greeting template includes "Good" and "—Your daily briefing includes the following:" In the notation used throughout, a particular key may be notated via <particular_key>. When generating the dialogue for the template (e.g., curating the filtered information), the value for the key <particular_key> may be substitutes for <particular_key>. In this example, there are two keys in the greeting template, notated as <temporal_period> and <user_id>. To generate the complete dialogue for the greeting section, a value for each key may be determined. For example, the value for the <temporal_period> key may be determined based on the time of day that the request was received. In the embodiment shown in FIG. 8, the request may be received at 7 AM. As such, the value for the <temporal_period> key may be set to "morning." The value for the <user_id> key may be set to the name of the requesting user (e.g., "User_A"). In some embodiments, the value of the user's name may be determined via voice identification from the request, an owner of the device, and/or other such means. To generate the dialogue for the greetings section, the determined values for each of the keys may be appropriately embed within the predefined dialogue.

As shown in FIG. 8, the greetings dialogue includes "Good morning User_A—Your daily briefing includes the following." If a second user (e.g., User_B) requests a report at 3 PM, the value for the <user_id> key may be set to "User_B" and the value for the <temporal_period> key may be set to "afternoon." The resulting greeting dialogue for such a scenario may include: "Good afternoon User_B—Your daily briefing includes the following." Similarly, if a third second user (e.g., User_C) requests a report at 9 PM, the value for the <user_id> key may be set to "User_C" and the value for the <temporal_period> key may be set to "evening." The resulting greeting dialogue for such a scenario may include: "Good evening User_C—Your daily briefing includes the following."

The weather section of the report may follow the greeting section. As shown in dialogue bubble 814, the weather dialogue may include "Weather Report: The current temperature in Seattle is 72 degrees Fahrenheit, with a projected high of 78 degrees and sunny skies expected throughout the day." Such weather dialogue may be generated via a weather dialogue template such as "Weather Report: The current temperature in <current_city> is <current_temp> degrees <temp_scale>, with a projected high of <expected_high> degrees and <forecast_summary>." The values for the keys <current_city>, <current_temp>, <temp_scale>, <expected_high>, and <forecast_summary> may be determined via various means. In some embodiments, <current_city> (e.g., Seattle) may be determined via a location service. The value for the key <temp_scale> (e.g., Fahrenheit or Celsius) may be determined via user configuration settings, user preferences, the value for <current_city>, or the like. Based on the value for <current_city>, weather information may be accessed, via a weather forecast service or application, and for the value of the <current_city> key. The accessed weather information may include values for the keys <current_temp>, <expected_high>, and <forecast_summary>. The values for these keys may further be based on the value for the <temp_scale> key. As shown in comment bubble 814, the exemplary values for the exemplary keys <current_city>, <current_temp>, <temp_scale>, <expected_high>, and <forecast_summary> include "Seattle," "72," "Fahrenheit," "78," and "sunny skies expected throughout the day."

In various embodiments, one or more of the report sections may be associated with multiple dialogue templates. In some embodiments, the dialogue template selected and employed for one or more report sections may be based on the date of the request, the time of day of the request, the information gathered for the section, or other such factors. As a non-limiting example, there may exist multiple weather dialogue templates, with one or more of the multiple weather dialogue templates being associated with the morning hours, one or more of the multiple weather dialogue templates being associated with the afternoon hours, and one or more of the multiple weather dialogue templates being associated with the evening hours. In addition to the selection of the weather dialogue template being based on the time of day that the report request was received, the selection of the weather dialogue template may be further based on the weather information retrieved from a weather service (e.g., whether the expected high temperature has yet to be reached that day).

For instance, if the request was received in the morning hours, and the temperature has not yet hit the value for the <expected_high> key, a first weather dialogue template may be selected and employed to generate the weather dialogue for the weather section of the report. The first weather dialogue template may include the followings predefined dialogue and embedded keys: "It is <current_temp> right now. You can expect a high of <expected_high> and <forecast_summary> today." may be selected and employed to generate the weather dialogue for the report. If the request was received in the morning hours, and the temperature has already reached the value for the <expected_high> key, a second weather dialogue template may be selected and employed to generate the weather dialogue for the weather section of the report. The second weather dialogue template may include the following predefined dialogue and embedded keys: "It is <current_temp> right now. You can expect <forecast_summary> and the temperature to head down to <expected_low>, where the value for the <expected_low> low key can be set to the day's expected low temperature, as determined via the accessed weather information. If the request was received in the afternoon hours, a third weather dialogue template may be employed: "Expect continued temperatures around <current_temp> and <forecast_summary>." If the request was received in the evening hours, a fourth weather dialogue template may be employed: "It's <current_temp> right now. Tomorrow, expect <forecast_summary_tomorrow> and temperatures to range from <expected_low_tomorrow> and <expected_high_tomorrow>."<forecast_summary_tomorrow>, <expected_low_tomorrow>, and <expected_high_tomorrow> are keys for tomorrow's weather, and the respective values may be determined from the accessed weather information.

With regards to the calendar (or calendar review) section of the report, in FIG. 8, two calendar events are included in the current report. As shown in the dialogue bubble 814, the dialogue template for reporting two events may include: "Calendar Review: You have a <event_time_1> with <event_participant_1> in <event_location_1>. Additionally, you are scheduled for <event_description_2> with <event_particpant_2> at <event_location_2>." Similar to the discussion regarding the weather section of the report, the values for the keys may be determined from the filtered calendar information.

Also similar to the weather section of the report, the dialogue template selected and employed for the dialogue for the calendar section may be dependent on the time of day that the report was requested, the number and/or nature of events that pass the filtering criteria for the calendar section, the length of the temporal period of relevancy, and the like. For example, if the report is requested in the morning hours and there is one event occurring in the temporal window of relevancy (e.g., the next twelve hours), the selected (from multiple possible calendar dialogue templates) template may include "Your first event is at <event_time_1>." In another embodiment, the calendar dialogue template for a single event (for a morning report request) includes "Your next event is at <event_time_1>." If the user's calendar has multiple events that are upcoming within the window of relevancy, the dialogue template "You have <number_of_events> upcoming events. Your first event is at <event_time_1>." Note that the temporal window of relevancy may be dependent on the time of day that the request for a report was received. For example, if the request was received in the morning hours of a day, the temporal window of relevancy may be eight hours. If the request is received in the evening hours, the temporal window of relevancy may be longer (e.g., 18 hours) in order to include events.

The traffic section for the report may be based on the calendar section of the report. For example, the traffic section may include travel and/or commute information about one or more events included in the calendar section. Accordingly, the dialogue for the traffic section may include traffic information relevant to the user's travel to and from the event. The traffic information may be based on the user's current location, the location of the event, the user's expected location prior to the event, the user's expect location after the event, and the like. The traffic information may further be based on the user's expected mode of travel to and from the event. For example, is the user likely to drive a car to the event, take public transportation to the event, bicycle to and from the event, walk to and from the event, employ air travel, employ rail travel, employ ride share services, and the like. The traffic information may be gathered from one or more traffic services, applications, websites, and the like.

A traffic dialogue template may be selected based on the time of day that the report request was received, the calendar information that passed the calendar filtering criteria, user preferences, the traffic information, expected modes of user travel, the user's current and/or expected locations, and the like. Traffic dialogue is generated based on the gathered/filtered traffic information and traffic dialogue is generated. In the example of FIG. 8, the generated dialogue for the traffic section of the report includes "Traffic Report: Given current traffic patterns, you should expect a 25 minute drive to your office. You can check your phone display for a visualization of current traffic patterns. Bistro_C is approximately a 10 minute walk from your office." As shown in this example, for dialogue-based reports, the dialogue may prompt the user to interact further with the device to view additional content, such as but not limited a visualization of current traffic patterns (e.g., a traffic map). The traffic dialogue in this example is non-limiting, and the dialogue templates may vary in the various embodiments.

Similar to the other report sections, a dialogue template for the task section of the report is selected based on one or more of the various factors discussed herein. The task dialogue is generated based on the selected task dialogue template and the filtered task information. As shown in the example of FIG. 8, via filtering the task information, it is determined that two tasks (an upcoming task to buy milk and an overdue task to send a package) are to be reported. Exemplary task dialogue for the report may be generated as: "Task Reminders: You have an upcoming task to buy milk on your way home from work at 5 PM. You also have an overdue task to send a package to your sister that was due at 7 PM yesterday."

For the current headlines (or news) section of the report, headlines dialogue may be generated from one or more headlines dialogue templates and the current headlines information. In some embodiments, in addition or alternatively to headline dialogue, at least a portion of the current headlines section may include one or more audio segments from one or more audible podcasts that report on headlines. That is, the report may include playing at least portions of one or more news-based podcasts (e.g., the Daily News Source Podcast). In some embodiments, such as the one shown in FIG. 8, introductory dialogue may be generated and played, such as "Current Headlines: Here's the current news as reported by the Daily News Source Podcast." After speaking the dialogue, the digital assistant may play the one or more podcast segments. In some embodiments, the current headlines section may not be included in every instance of the report. For example, the current headlines section may be only included in one report per day. The frequency of including the current headlines section and/or the podcasts to include in the report may be user configurable. In some embodiments, the current headlines section may only be included (after the first instance in the day) if significant headlines or news occurs since the last reporting of the news.

Figure 9A:
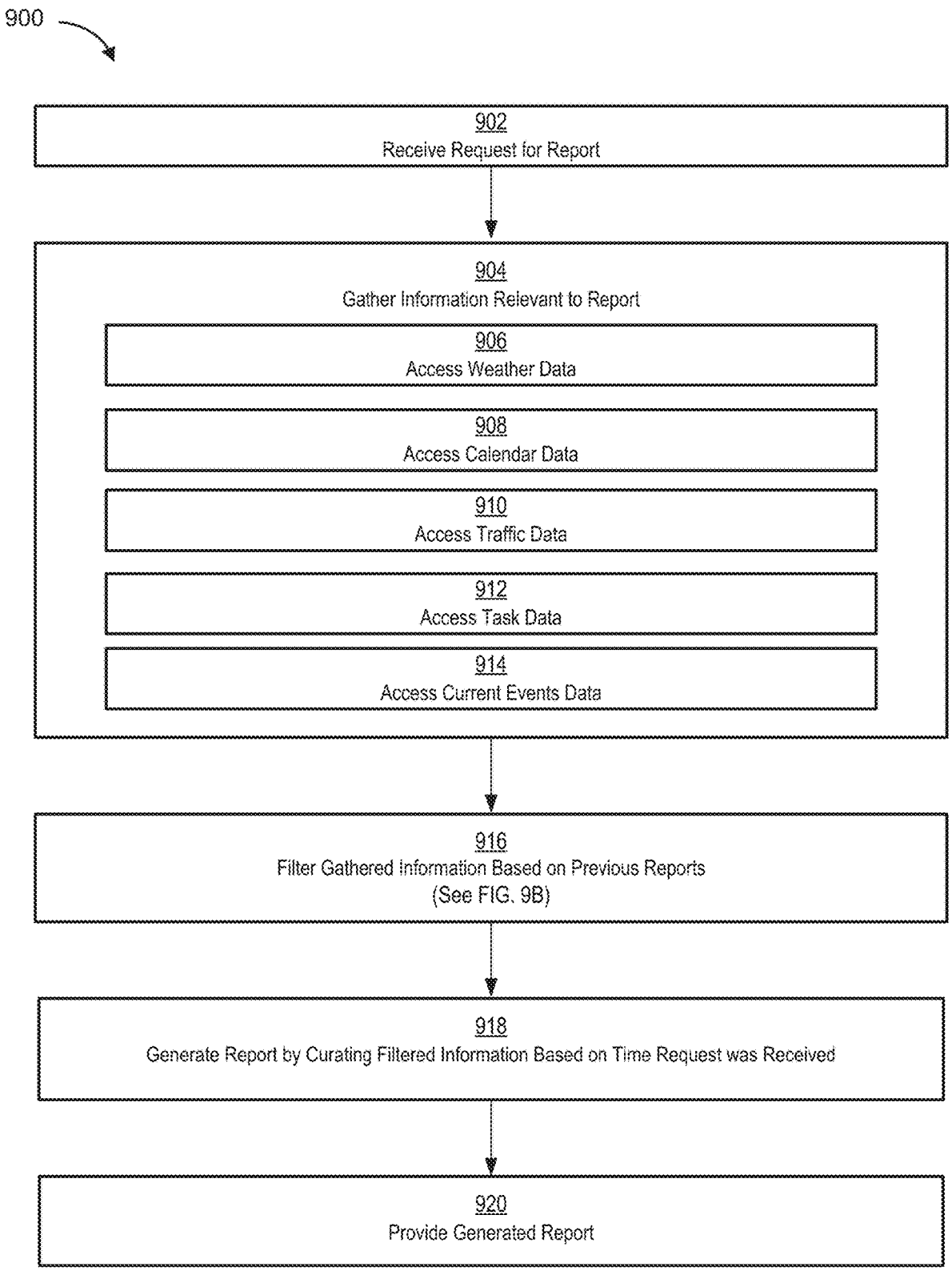
FIGS. 9A-9B illustrate processes for providing briefings, according to various examples.
Figure 9B:
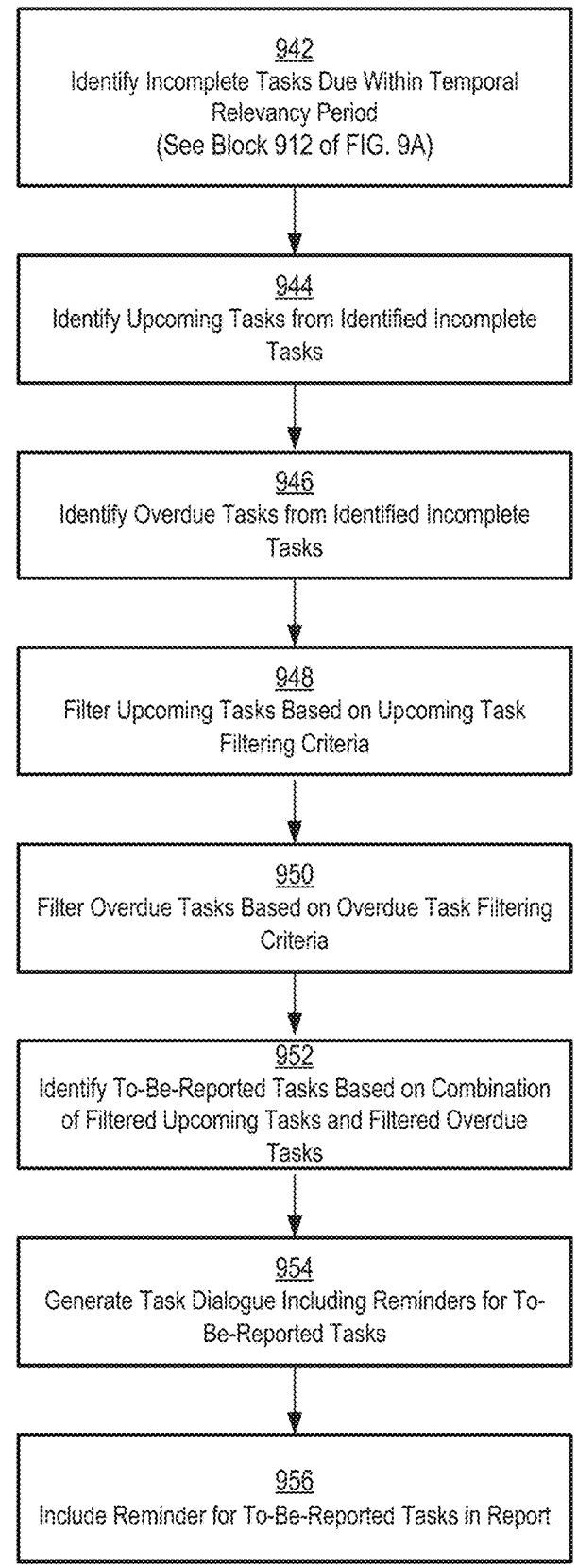

FIGS. 9A-9B illustrate processes 900 and 940 for providing a report (e.g., a daily briefing), according to various examples. Processes 900 and/or 940 may be performed, for example, using one or more electronic devices implementing a digital assistant. In some examples, processes 900 and 940 may be performed using a client-server system (e.g., system 100), and the blocks of processes 900 and 940 are divided up in any manner between the server (e.g., DA server 106, 8201) and one or more client device (e.g., any of devices 802-808). In other examples, the blocks of processes 900 and 940 are divided up between the server and multiple client devices (e.g., a mobile phone and a smart watch). Thus, while portions of processes 900 and 940 are described herein as being performed by particular devices of a client-server system, it will be appreciated that processes 900 and 940 are not so limited. In other examples, processes 900 and 940 are performed using only a client device (e.g., user device 104, 810A-810H) or only multiple client devices. In processes 900 and 940, some blocks are, optionally, combined, the order of some blocks is, optionally, changed, and some blocks are, optionally, omitted. In some examples, additional steps may be performed in combination with the processes 900 and 940.

Process 900 begins at block 902, where a request for a report is received. The request may be encoded in a natural language utterance (e.g., "Hey Siri, what is my briefing?"), spoken by a user (e.g., user 810 of FIG. 8). The utterance may be received and interpreted by a digital assistant (e.g., Siri) implemented by one or more computing devices (e.g., devices 802-808 of FIG. 8). That is, an audio signal may be received at an electronic device, which encodes a spoken request for a current report targeted to the user that uttered the spoken request. In other embodiments, the request may be encoded in other forms of user-initiated commands (e.g., a text-based command, a click or other such selection, a gesture, such as but not limited to a swipe or pinch on a touch-sensitive surface, a gaze of the user's eyes, and the like). In response to receiving the request, a digital assistant may initiate the preparation (or generation) of the requested report. If the generation of the report is initiated by a user request, then the embodiment may be an on-demand embodiment. In other embodiments, the generation of the report may be initiated automatically, via one or more triggers provided by one or more scheduling services. The term current report may be used to distinguish the report that is being prepared in response to the request (or a trigger supplied by the scheduling service), from previously generated reports (e.g., previous reports) and also from reports that may be generated in the future (e.g., subsequent reports). Thus, the current report may be associated with a current time that the request or trigger was received at the electronic device.

Whether the generation of the report is initiated by a user request or via a scheduling service, at block 904, information relevant to the report may be gathered. That is, report information may be gathered in response to and/or in accordance to receiving a request from a user or a trigger from a scheduling service. As discussed throughout, the report may include one or more sections directed to one or more topics or subjects. Thus, the report may include information pertaining to virtually any subject or topic and the information for each section may be gathered from virtually any electronically accessible resource. More specifically, at block 904, any information that is relevant and/or material to the report may be gathered, collected, accessed, and/or aggregated from various information sources, or services, that the digital assistant has access. For example, the digital assistant may consult one or more electronic calendars associated with the user, a reminder (or to-do list) application, a weather service, a traffic service, one or more news sources (e.g., textual and/or audio-based news aggregators or newsfeeds), a location service (e.g., a geolocation and/or GPS application), one or more social network applications, one or more search engine applications, one or more podcast and/or video feeds, streams, or pipelines, and the like. The information may be sourced via one or more applications installed locally on the electronic device that is implementing the digital assistant. In some embodiments, the digital assistant may request at least a portion of the information from various online resources, such as but not limited to websites, distributed cloud-based services, online databases, repositories, libraries, encyclopedias, archives, a corpus, and the like.

In non-limiting embodiments, the report may include at least one of a greeting section, a weather section, a calendar review section, a traffic section, a task (or to-do list) section, and a current headlines/events (or news) section. As such, information (or data) regarding each of these sections may be gathered at block 904. As shown in FIG. 9A, block 904 may include one or more sub-blocks, where each sub-block is directed towards gathering and/or accessing the data for one or more sections of the reports. As noted above, various electronically available resources may be referenced to gather the data for each report section. Because the embodiments may vary in what information and/or what sections to include in a report, the sub-blocks of block 904 may vary from those shown in FIG. 9A. For example, block 904 may include additional, alternative, and/or fewer sub-blocks corresponding to additional, alternative, and/or fewer report sections. In the non-limiting embodiment of process 900, at sub-block 906, weather data may be gathered. Weather data may include any weather information, weather forecast, weather models, and statistical distributions of historical and/or predicted of weather patterns, temperatures, precipitation, humidity, and the like. Various electronically available weather resources (e.g., a weather application) may be consulted to gather the weather data. The weather data may correspond to the user's current geolocation. Accordingly, one or more location services (e.g., satellite-based, cellular triangulation, Wi-Fi triangulation, and the like) may be consulted to determine which weather data to gather. In some embodiments, the weather data may correspond to a geolocation that the user is expected to travel to in the near future. Thus, one or more travel schedules (e.g., included in an electronic calendar or travel scheduling applications) for the user may be consulted when accessing the weather data.

At sub-block 908, calendar data may be accessed. In accessing calendar data, one or more electronic calendars associated with the user may be consulted and/or referenced. Calendar data may include one or more (virtual or physical) meetings, events, appointments, scheduled travel, and the like, of which the user may be predicted to attend, participate, watch, or the like. As noted, one or more electronic calendars, travel scheduling applications, or the like may be consulted when gathering calendar data. Each appointment, event, meeting, or the like of the calendar data may include an associated timestamp that corresponds to the time that event is supposed to occur. At sub-block 910, the traffic data may be accessed. The traffic data accessed may be dependent on the calendar data. For example, the geolocation of any meeting, appointment, event, or travel included in the calendar data. The accessed traffic data may be based on the user's current and/or expected geolocation (e.g., the geolocation of a calendar event). When accessing the traffic data, one or more traffic resources may be consulted. For example, a traffic feature of one or more spatial mapping applications may be referenced when accessing the traffic data.

At sub-block 912, task data may be accessed. Task data may include one or more tasks, action items, goals, benchmarks, or the like that the user is supposed is expected to accomplish and/or complete. Thus, one or more task and/or to-do resources may be consulted when gathering task data. In various embodiments, one or more of the tasks of the task data may include and/or be associated timestamp, for which the task is supposed to be completed by. Thus, the included and/or associated timestamp may be referred to as a task-due timestamp. The task-due timestamp may indicate a deadline (time and date) that the task is supposed to be completed by. Some non-limiting examples of tasks (and their associated task-due timestamps) included in the task data may include: (buy milk at 5 PM today), (send at package at 7 PM yesterday), (wash dishes at 10 PM today), (takeout trash at 11 PM today), and the like. Note that these tasks are provided for exemplary purposes only, and the embodiments may vary, including more, less, and/or alternative tasks. As shown is at least the dialogue bubble 814 of FIG. 8, a reminder (or other such indication) of at least a portion of the tasks may be provided in a task reminder section of the report. The reminder may indicate the task, the task-due timestamp, as well as whether the task is an upcoming task or if the task is an overdue task. In some embodiments, the user may manually enter a task, as well as corresponding task-due timestamp into a task (or to-do list) application. Some tasks may be automatically detected and entered into the task application. For example, if a user is tasked with generating a sales report for a standing weekly meeting, the digital assistant may generate and enter in the task application, weekly tasks for the preparation of the report.

Note that each of the tasks included in the task data may be an incomplete task. An incomplete task may be a task, where the user has not yet achieved, accomplished, met the requirements for, finished, and/or otherwise completed the task. An incomplete task is in contrast to a completed task, where the user has achieved, accomplished, met the requirements for, finished, and/or otherwise completed the task. In some embodiments, accessing task data may include, identifying, from a plurality of tasks associated with the user, a set of incomplete tasks. In some embodiments, only tasks within a temporal period of relevancy may be included in the set of incomplete tasks. More specifically, a difference between the current time and the task-due timestamp for each task in the identified set of incomplete tasks may be less than an temporal threshold, as indicated by the temporal period of relevancy. Some embodiments may include a separate temporal period of relevancy threshold for upcoming tasks and overdue tasks. For example, the temporal period of relevancy may be 24 hours for upcoming tasks, while the temporal period of relevancy may be 12 hours for overseer tasks. See below for a discussion of upcoming and overdue tasks. The period of temporal relevancy may be user configurable. In some embodiments, the temporal period of relevancy may extend only throughout the task's due date. For example, only tasks that are due the day associated with the current time are included in the set of incomplete tasks. Other embodiments are not so limited, and the temporal period of relevancy may include virtually any amount of time. The temporal period of relevancy may be employed to limit information included in the report, to information associated with a limited period of time. For instance, the user may wish to not be reminded of tasks that are due are week out from the current time. Thus, the temporal period of relevancy may act as a pre-filter, as to what information to include in a report. Although the temporal period of relevancy is discussed in the context of the task information, similar temporal periods of relevancy for the information relevant to other report sections may be employed. The temporal period of relevancy may vary from information type to information types, as well as to different report sections. The plurality of tasks may be included in one or more task applications. That is, the plurality of tasks may be distributed across multiple task applications.

Further note that, depending on a difference between a current time and the task-due timestamp, some of these tasks may be upcoming tasks, while other tasks may be overdue tasks. An upcoming task may be a task, where the task-due timestamp is temporally subsequent to the time that the request for the report was received, or alternatively the task-due timestamp is subsequent to the time that the report was generated and/or provided to the user. That is, an upcoming task is an incomplete task, where the task-due timestamp is in the future, i.e., the user still has time to complete the task by the deadline (as indicated by the task-due timestamp) and/or in a timely fashion. An overdue task may be a task, where the task-due timestamp is previous to the time that the request for the report was received, or alternatively the task-due timestamp is subsequent to the time that the report was generated and/or provided to the user. That is, an overdue task is an incomplete task, where the task-due timestamp is in the past, i.e., the user has not completed the task by the deadline and/or in a timely fashion. Thus, as the deadline for an upcoming task is reached and surpassed, without the task being indicated as completed, a classification of the incomplete task may transition from that of an upcoming task to an overdue task. In some embodiments, the user may manually indicate that the task was completed via the one or more task applications. In at least some scenarios, and depending upon the task, the completion of a task may be automatically detected via one or more capabilities of the device that is implementing the digital assistant. For example, if the task includes purchasing an item via an e-commerce platform, the digital assistant may automatically detect the successful transaction via an application associated with the e-commerce platform. Thus, the transition of the classification of the task from incomplete to complete may be manually performed or automatically detected.

In some embodiments, accessing task data may include generating a set of upcoming tasks, which is a subset of the identified set of incomplete tasks. The task-due timestamp of each task in the set of upcoming tasks is subsequent to a current time of the generation of report being generated (which, as noted above, may be referred to as the current report). Accessing task data may further include generating a set of overdue tasks, which is also a subset of the identified set of incomplete tasks. The task-due timestamp of each task in the set of overdue tasks is previous to the current time corresponding to and/or associated with the current report.

Thus, as discussed above, at least a portion of the tasks in the task data may include and/or be associated with a task-due, a first classification as: complete or incomplete, and a second classification as: upcoming or overdue. Note that each of the classifications of complete/incomplete and upcoming/overdue are time dependent. For example, a task may currently be classified as complete, but at a previous time, the classification may be transition to complete once the user completes the task. Similarly, an incomplete tasks may currently be classified as upcoming, and if the associated deadline (as indicated by the task-due timestamp) passes without the user completing the task, the classification of the task may be that of an overdue task at a time that is subsequent to the task-do timestamp. In addition to such features, at least a portion of the tasks in the task data may include or be associated with a record and/or log (e.g., a data structure) that indicates whether a reminder or other indication of the task has been reported in one or more pervious reports provided to the user. If the task has been reported in one or more previous reports (i.e., reports previous to the current report), the then record may indicate or encode how many previous reports the task has been included in, a timestamp associated with each of the previous reports that have included a reminder of the task, whether the task was reported as an upcoming task or an overdue task, and any other such relevant information. Because the record or log indicates previous reporting of the task, the record associated with a task may be referred to as a reported status for the task. In some embodiments, a separate reported status data structure for each task may be maintained. In other embodiments, a single such data structure may be maintained, wherein the single data structure includes the reported status of all the tasks in the set of incomplete tasks.

As discussed below, various filtering criteria may be applied to, or depend upon, the reported status of the task data. For example, in order to not burden a user with reporting a task too frequently, the reported status may be referenced to determine whether the task has been previously reported, when the last time it was reported, how frequently the task has been reported, how many times the task has been reported, and the like. If a particular task has been reported within the last hour (prior to the current time), then the particular task may be filtered such that the particular task is not reported in the current report. Although discussed in the context of the task information, a reported status structure for information associated with other report sections may be employed so that the other information may also be filtered based on previous reporting of the information.

At sub-block 914, current events data may be gathered. Current events data may include news data gathered from one or more online news services, applications, aggregators, websites, and the like. The news data may include audio information, such as but not limited to one or more podcast feeds that the digital assistant has access to. In some embodiments, current events data may be accessed via one or more podcasts applications.

At block 916, the information or data for each report section is filtered. In order to not over-report information, or otherwise burden the user with information they may already be aware of, the information reported in a brief may be filtered, such that the report does not include information that already has been reported, at least above one or more thresholds (e.g., frequency, total number of times reported, and the like). Thus, filtering the information at block 916 may be based on one or more previous reports. The information for each of the report sections may be filtered via separate filtering criteria. In some embodiments, the filtering criteria may be configured via one or more user configurations. One non-limiting, but exemplary, embodiment of filtering the task information (or task data is discussed) for the task report section is discussed in conjunction with process 940 of FIG. 9B. Briefly here, each of the set of upcoming tasks and the set of overdue tasks may be filtered. The sets may be filtered with equivalent, similar, or different filtering criteria. The union of the filtered upcoming/overdue sets may be employed to generate a set of to-be-reported tasks. Reminders for the tasks included in the set of to-be-reported tasks may be included in the report.

The upcoming/overdue sets may be filtered based on a comparison between the current time and the task-due timestamps of the incomplete tasks. In some embodiments, the comparison may include a difference (or temporal distance) between the current time and the task-due timestamps. The filtering criteria may be set and/or configured such that each task in the set of incomplete tasks is reported only in reports that are provided on the day that the task is due (e.g., as indicated or encoded by the task's associated or corresponding task-due timestamp). In other embodiments, the sets are filtered such that each task is only reported the day before it is due and/or on the day that the task is due. In still other embodiments, an overdue task may be reported on the day after its due date. Other embodiments are still more general, and an upcoming task may be reported up to M days before it is due and/or an overdue task may be reported up to N days after its due date, where M and N are positive integers. In some embodiments, a user may be enabled to configure both M and N.

In some embodiments, the filtering criteria may be based on how many times or how often (e.g., relative or absolute frequency) the task has been reported in one or more previous reports. That is, the filtering criteria may be applied to and/or based on the reported status of the tasks. In conjunction with the reported status, the filtering criteria may be further based on the task's current classification as an upcoming task or an overdue task, and what the task's classification when it was previously reported in one or more previous reports. In one embodiment, the filtering may occur such that the each task is reported at most twice: once when the task is an upcoming task and, if the task transitions to an overdue task, once as an overdue task. In some embodiments, the task may be reported as an upcoming task, the day of the task's due date, and once as an overdue task during the same day as the due date. In other embodiments, the task may be reported an overdue task during the day after the task's due date. In some embodiments, the task may be reported at most L times as an upcoming task and at most K times as an overdue task, where L and K are positive integers. L and K may be configurable by the user. Any combination of filtering criteria may be employed on the sets of overdue/upcoming tasks to generate the set of to-be-reported tasks. Note that the set of to-be-reported tasks may include two disjoint subsets: a set of upcoming to-be-reported tasks and a set of overdue to-be-reported tasks. The set of upcoming to-be-reported tasks includes upcoming tasks, where a reminder of at least a portion of the upcoming tasks included in the set of upcoming to-be-reported tasks may be included in the task portion of the report. The set of overdue to-be-reported tasks includes overdue tasks, where a reminder of at least a portion of the overdue tasks included in the set of overdue to-be-reported tasks may be included in the task portion of the report. The information associated with the task section, as well as other report sections, may be filtered via additional, fewer, and/or alternative processes and/or filtering criteria, as that shown in FIG. 9B.

In one non-limiting embodiment, for the calendar section of the report, the calendar events included in the calendar information may be filtered via whether the calendar events have been reported in one or more previous reports. As such, a reported status data structure for each the calendar events may be maintained. By using the reported status data structure for the calendar events, the calendar information may be filtered in a similar way to that discussed in conjunction with the filtering of tasks. Additionally and/or alternatively, the calendar events may be filtered via a prioritization of the events. For example, a set of calendar events included in the calendar data may be generated. Similar to the set of incomplete tasks, a temporal period of relevancy may be employed to filter the events to include in the set of calendar events. The events in the set may be ranked, via an event priority score. The event priority score for an event may be based on one more factors, such as but not limited to an importance metric (e.g., the user may set an importance score to the events), the frequency of the events (e.g., the frequency of reoccurring meetings), the location of the event, the user's current location, the time of day and/or date of the event (e.g., a difference between the current time and the time of the event), whether the event is associated with the user's employment, whether the event is associated with the user's family members, friends, and the like. In at least one embodiment, the event priority score for an event may be determined based on one or more hierarchies, networks, and/or graphs. For the example, the event priority score for an event may be based on the user's position in an organization chart (e.g., an org chart) and the position in the org chart of other individuals associated with the event. In another example, the event priority score for an event may be based on a distance between the user and other individuals associated with the event in a network (e.g., a social network). The event priority score for an event may be based on other factors, such as factors designated by the user in a configuration of the digital assistant.

The events in the set of events may be ranked via the event priority scores to create a ranked list of prioritized events. The events may be filtered based on such rankings. The events may be filtered such that the top three (e.g., the number may be configured by the user) ranked events may be included in the calendar section of the report. The set of to-be-reported tasks may be similarly scored, ranked, and filtered based on task priority scores in a similar manner.

At block 918, the report may be generated based on the filtered information. In some embodiments, generating the report may include curating the filtered information. Curating the filtered information may include generating dialogue. Exemplary dialogue generated for various report sections is shown in dialogue bubble 814 of FIG. 8. As discussed in the conjunction with FIG. 8, generating the dialogue may be based on selecting one or more dialogue templates for each report section. A dialogue template may include a data structure that includes predefined dialogue (e.g., natural language paragraphs, paragraph fragments, sentences, sentence fragments, words, tokens, and the like), as well as key-value pairs embedded within the predefined dialogue. One or more values for a specific key may be determined from the information gathered or accessed for the corresponding report section. In addition to being based on the information for a section, a value for a particular key in a dialogue template may be determined via the request for the report, a user associated with the request, a context of the request and/or user, time of request, date of request, and the like. A dialogue template may be interchangeably referred to as a dialogue pattern.

In various embodiments, one or more of the report sections may be associated with multiple dialogue templates. In some embodiments, the dialogue template selected and employed for one or more of the report sections may be based on the date of the request, the time of day of the request (e.g., the current time), the information gathered for the section, or other such factors. As a non-limiting example, there may exist multiple dialogue templates for the task section. In addition to the current time associated with the request, the selection of the task dialogue template may be based on the number of tasks to be reported in the report (e.g., the cardinality of the set of to-be-reported tasks). The selection of the dialogue template may be further based cardinality of the set of upcoming to-be-reported tasks and/or the cardinality of the set of overdue to-be-reported tasks, which may be disjoint subsets of the set of to-be-reported tasks. For instance, in the event that the user requests the report in the morning, and there are two upcoming to-be-reported tasks (e.g., calling Mom and buying milk) and one overdue task (e.g., wash dishes), a dialogue template may be selected to generate the example dialogue: "You have two upcoming reminders for today: Call Mom at 5 PM and buy milk. Also, you have one reminder from earlier: wash dishes." If the cardinality of one or more of the set of to-reported tasks, the set of upcoming to-be-reported tasks, and/or the set of overdue to-be-reported tasks is larger than one or more task thresholds, a dialogue template may be selected, such that a number of tasks, rather than the details of the tasks is reported in the generated dialogue. In at least one embodiment, each of the upcoming task threshold and the overdue task threshold may be set to four. In a scenario where the cardinality of the set of upcoming tasks is six and the cardinality of the set of upcoming tasks is five, a dialogue template may be selected, such that the generated dialogue includes "You have six upcoming reminders for today, and five reminders from earlier." It is noted that the upcoming and overdue thresholds need not be equal. For instance, dialogue such as "You have two upcoming reminders for today: Call Mom at 5 PM and buy milk. Also, you have two reminders that are now overdue."

In some embodiments, the selection of the dialogue template may be based on whether the dialogue is to be provided via a spoken utterance by the digital assistant, or whether the dialogue is to be provided via text-based means (e.g., texted displayed and/or printed on the device's display). For instance, dialogue templates for spoken dialogue may include pauses between sentences, individual reminders, and the like. A dialogue template for displayed texted may include "new line characters," delimiters, bullet points, indents, or other formatting characters to format the task reminders in an easily readable format. Additionally, the upcoming and overdue thresholds may be set differently for spoken dialogue than that for text-based dialogue. Because a user may want briefer spoken reports, but may prefer longer text-based reports, the thresholds for spoken dialogue may be less than the thresholds for text-based dialogue.

As another example, a calendar dialogue template may be selected based on one or more of the various factors discussed herein. The combination of the ranked and filtered set of calendar events and the selected calendar dialogue template may be employed to generate various dialogues to report the calendar events. Some non-limiting examples of generated calendar dialogue are shown below. Note that similar to the tasks, the generated dialogue may be dependent on the number of events to be reported, as well as one or more event thresholds. Such example calendar dialogue includes, but is not limited to: "Your first event is at 9 AM. Your next event is at 2:15 PM," "Your first event is at 9 AM. You have three events at 3 PM," and "Your first event is today is at 9 AM. Tomorrow, your first event is at 10:30 AM." Note that the embodiments may vary, and the calendar dialogue may vary with the embodiments.

Upon the generating of the dialogue for each of the report sections, the report may be generated and/or curated by aggregating and packaging the dialogue generated for each of the report sections. Appropriate section breaks, transitional language, introductions, and the like may be included in the report. For example, a welcome dialogue may be included in the beginning of the report and one or more transitional dialogues may be inserted between the dialogues of the various sections. Such section breaks, transitional language, welcome messages, and the like may be based on time of day, whether the dialogue is spoken or text-based dialogue, and the like. At block 920, the generated report may be provided to the user. As discussed throughout, in some embodiments, the report may be provided via the digital assistant speaking the dialogue. In other embodiments, the report may be provided via one or more displays on the one or more electronic devices.

Turning to FIG. 9B, process 940 illustrates a process for generating the task section of a report. In a general sense, process 940 includes gathering task data, filtering the task data, curating the filtered data to generate task dialogue that includes reminders for the tasks to be reported, and including that task dialogue in the report. This embodiment is non-limiting, and other embodiments may generate the task section report via alternative means. Furthermore, other report sections may be generated via a similar or alternative process.

Process 940 begins at block 942, where one or more incomplete tasks, which are due within a temporal relevancy period, are identified. Identifying the incomplete tasks may be in response to receiving a request for a current report at a current time, via a user or a trigger from a scheduling service. Various embodiments of identifying incomplete tasks are discussed in conjunction with at least block 912 of FIG. 9A. However, briefly here, identifying incomplete tasks may include identifying, from a plurality of tasks associated with the user, a set of incomplete tasks. At least a portion of the tasks in the set of incomplete tasks may include a task-due timestamp that indicates the time for which the task is to be completed by. An incomplete task may further include a reported status that indicates whether the task has been associated with a previous report targeted to the user. If and/or when the task has been associated with one or more previous reports, the reported status may further indicate a reported timestamp associated with the one or more previous reports.

At block 944, one or more upcoming tasks may be identified from the identified incomplete tasks. Identifying upcoming tasks may include generating a set of upcoming tasks. The set of upcoming tasks may be a first subset of the set of incomplete tasks. The task-due timestamp, of at least a portion of the tasks in the set of upcoming tasks, may be subsequent to the current time. At block 946, one or more overdue tasks may be identified from the identified incomplete tasks. Identifying overdue tasks may include generating a set of overdue tasks. The set of overdue tasks may be a second subset of the set of incomplete tasks. The task-due timestamp, of at least a portion of the tasks in the set of overdue tasks, may be previous to the current time. The set of upcoming tasks and the set of overdue tasks may be disjoint subsets of the set of incomplete tasks.

At block 948, the identified upcoming tasks may be filtered via one or more upcoming task filtering criteria. At block 950, the identified overdue tasks may be filtered via one or more overdue filtering criteria. The upcoming and overdue filtering criteria may be similar or dissimilar filtering criteria as discussed throughout. In some embodiments the upcoming and overdue filtering criteria are based on and/or applied to the reported status of the upcoming and overdue tasks respectively. In at least one embodiment, one or more filtering criteria may be based on and/or applied to the union of the set of upcoming tasks and the set of overdue tasks. Any of the various filtering criteria discussed herein, as well as any additional and/or alternative filtering criteria may be applied to the sets of upcoming and overdue tasks at blocks 948 and 950. For example, the filtering criteria applied at blocks 948 and 952 may be similar to those applied in the discussion of FIGS. 10A-10B. At block 952, to-be-reported reported tasks are identified from the combination of the filtered upcoming tasks and the filtered overdue tasks. To-be-reported tasks may include tasks, for which reminders of, are included in the task portion of the report. Identifying to-be-reported tasks may include generating a set of to-be-reported tasks, the via one or more filtering criteria applied to the reported status of at least a portion of the tasks included in the union of the set of upcoming tasks and the set of overdue tasks.

At block 954, task dialogue may be generated based on the tasks included in the set of to-be-reported tasks. The task dialogue may include reminders for at least a portion of the tasks included in the set of to-be-reported tasks. The task dialogue may be generated based on a selection of a dialogue template, as discussed throughout. At block 956, the task dialogue that includes the task reminders for the to-be-reported tasks are included in the task section of the report.

The operations described above with reference to FIGS. 9A-9B are optionally implemented by components depicted in FIGS. 1-4, 6A-B, and 7A-C. For example, the operations of processes 900 and 940 may be implemented by system 800 discussed in conjunction with FIG. 8. It would be clear to a person having ordinary skill in the art how other processes are implemented based on the components depicted in FIGS. 1-4, 6A-B, and 7A-C.

FIGS. 10A-10B illustrate non-limiting examples of identifying incomplete tasks to include in various reports based on whether the tasks have been previously reported. That is, FIGS. 10A-10B show the results of at least portions of process 940 of FIG. 9B. In FIGS. 10A-10B, the filtering criteria to the identified set of upcoming tasks and the set of overdue tasks are based on whether the tasks have been previously reported. That is, the filtering is accomplished by employing the reported status data structure of the tasks to determine whether each task has been previously reported. The temporal period of relevancy for identifying the set of incomplete tasks includes the day that the report is requested. In these non-limiting embodiments, the user requests multiple reports throughout the day. More specifically, in the example embodiments of FIGS. 10A-10B, each incomplete task is reported on its due date (or perhaps the next day if it is an overdue task) and is reported at most twice: once as an upcoming task in the first report of the day, and if it not completed by its task deadline, it is reported once as an overdue task in the first report after the task transitions from an upcoming report to an overdue report. Note that in FIGS. 10A-10B, only the task section of the reports are discussed. However, the various reports may include other sections that are not discussed in conjunction with these figures.

FIG. 10A illustrates a reporting scenario 1000, such that six reports are provided to a user over the course of the current day (e.g., today) and the next day (e.g., tomorrow). More specifically, the user receives a total of five reports (e.g., first report 1004, second report 1006, third report 1008, fourth report 1010 and fifth report 1012) at various times throughout the current day and a sixth report (e.g., sixth report 1014) tomorrow. To illustrate task filtering such that a task is reported at most twice: once as an upcoming task and once as an overdue task, a single incomplete task is contemplated in FIG. 10A: to buy milk with a task-due timestamp indicating 5 PM that day (e.g., the task-due timestamp indicates the current day @ 5 PM). The first report 1004 (e.g., Report_1) is provided at 9 AM. At 9 AM, the single task is classified as an upcoming task. Because the task has yet to be reported as an upcoming task, and it is the day of its due date, a reminder for a single upcoming task 1026 (e.g., "Reminder: Upcoming Task—Buy Milk Due today @ 5 PM") in included in the first report 1004. The reported status of the task may be consulted to determine whether the task has been previously reported as an upcoming task. When the reminder of the task 1026 is included in the first report 1004, the reported status for the task 1026 may be updated to indicate that task 1026 has been reported once and at 9 AM of the current day, as an upcoming task.

A second report 1006 (e.g., Report 2) is provided to the user at noon on the same day. Because task 1026 is still an upcoming task, and it has already been reported as an upcoming task in the first report 1004, a reminder for the task is not included in the second report 1006. The reported status of the report may be consulted to determine that the task 1026 has already been reported in the first report 1004. A third report 1008 (e.g., Report_3) is provided to the user at 3 PM on the same day. Because the task is still upcoming, and it has already been reported as an upcoming task, a reminder for the task is not included in the second report 1006.

When the time of the current day reaches 5 PM (in the user's current timezone), and the user has not completed the upcoming task 1026, the classification of the task is transitioned from an upcoming task to an overdue task. The transition of task's classification may be logged in its reported status. A fourth report 1010 (e.g., Report_4) is provided to the user at 6 PM on the same day. The incomplete task is now an overdue task and the now overdue task has not yet been reported as an overdue task. Because the fourth report 1008 is the first report provided after the task transitioned to an overdue task, a reminder 1036 for the now overdue task may be included in the fourth report 1010 as the overdue reminder 1036: "Reminder: Overdue Task—Buy Milk was due today @ 5 PM." A fifth report 1012 (e.g., Report_5) is provided to the user at 9 PM on the same day. Because the overdue task 1026 has already been reported as an overdue task in the fourth report 1010, a reminder for the task is not included in the fifth report 1012. A sixth report 1014 (e.g., Report_6) may be provided at 9 AM the next day. Even if the task is still an incomplete task, no reminder for the task is included in the sixth report 1014.

Turning attention to FIG. 10B, which illustrates another reporting scenario 1000, such that seven reports are provided to the user over the course of the current day (e.g., today), the previous day (e.g., yesterday), and the next day (e.g., tomorrow). More specifically, the user receives a first report 1052 yesterday, a total of five reports (e.g., second report 1054, third report 1056, fourth report 1058, fifth report 1060 and sixth report 1062) at various times throughout the current day and a seventh report (e.g., sixth report 1064) tomorrow. To illustrate task filtering such that a task in reported at most twice: once as an upcoming task and once as an overdue task, four incomplete tasks are contemplated in FIG. 10B: wash dishes with a task-due timestamp of 10 PM yesterday, take out trash with a task-due timestamp of 11 PM yesterday, buy milk with a task-due timestamp of 5 PM today, and send UPS package with a task-due timestamp of 8 PM today. Note that the send UPS package task is not initially included in the plurality of tasks, of which the set of incomplete tasks is initially identified. Rather, the user added the send UPS incomplete task to the plurality of tasks sometime between noon and 3 PM during the current day. As noted in the discussion in conjunction with FIG. 10A, the temporal period of relevancy was restricted to the user's current day. In contrast to the discussion in conjunction with FIG. 10A, the temporal period of relevancy may extend into the day before, as well as the user's next day.

The first report 1052 (e.g., Report_1) is provided to the user at 9 PM yesterday. At that time, the user had two upcoming tasks: wash dishes @ 10 PM and take trash out @ 11 PM 1084. These upcoming tasks had not yet been reported to the user, thus the first report includes a reminder for each as shown in the first report 1052, i.e., reminders 1082 and 1084 respectively. The user may neglect to complete either of these tasks before going to bed. Furthermore, the user may receive a second report 1054 (e.g., Report_2) at 9 AM today (e.g., the user's current day). At 9 AM today, the two tasks that were previously reported as upcoming are now overdue, and have not yet been reported as overdue tasks. Accordingly, a reminder for each of these now overdue tasks may be included in the second report 1054: i.e., reminders 1092 and 1094 respectively. Comparing reminders 1092/1094 to 1082/1083 illustrates that the reminders may indicate the transition of the tasks from upcoming tasks to overdue tasks. Furthermore, by 9 AM today, the temporal window of relevancy may have shifted since 9 PM yesterday, such that another incomplete task is now within the temporal period (or window) of relevancy: buy milk @ 5 PM today. Thus, a reminder to buy milk (e.g. reminder 1086) may also be included in the second report 1054.

A third report 1056 (e.g., Report_3) may be provided to the user at noon today. Because the upcoming task to buy milk has already been reported as an upcoming task previously, and each of the overdue tasks have already been reported as overdue tasks previously, third report 1056 need not include any task reminders. As noted above, at some point in time between noon and 3 PM, the user may add an additional task: send UPS package with a due time of 8 PM today, to their tasks (e.g., with a task or to-do application). A fourth report 1058 (e.g., Report_4) is provided at 3 PM. Because the newly added upcoming task to send a UPS package has not yet been reported, an upcoming reminder 1088 for the upcoming task of sending a UPS package is included in the fourth report 1058. As shown in FIG. 10B, the reminder 1088 may indicate that the upcoming task to send the UPS package is a new task.

A fifth report 1060 (e.g., Report_5) is provided at 6 PM today. At 6 PM, the task to buy milk is still incomplete and has been transitioned to an overdue task. Because the task to buy milk has not yet been reported as an overdue task, a reminder 1096 that indicates the now overdue task to buy milk may be included in the fifth report 1060. A sixth report 1062 (e.g., Report_6) may be provided at 9 PM today. Even if the task to by milk is still incomplete, because it previously been reported as an overdue task, a corresponding reminder need not be included in the sixth report 1062. At 9 PM, the task to send the UPS package may still be an incomplete package, and is now overdue. Thus, the classification of the task may be transitioned to an overdue task. Because the task has not yet been reported as an overdue task, a reminder 1098 of the now overdue task may be included in the sixth report 1062. A seventh report 1064 (e.g., Report_7) may be provided at 10 AM the next day (e.g., tomorrow). Each of the tasks discussed in conjunction with FIG. 10B have already been reported twice (once as an upcoming task and once as an overdue task). As such, no reminders for these tasks need to be included in the seventh report 1064.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method for operating a digital assistant, the method comprising:
    in accordance with receiving an audio signal at an electronic device and at a current time, wherein the audio signal encodes a spoken request for a current report targeted to a user that spoke the request, employing one or more processors and a memory of the electronic device, to perform operations comprising:
        identifying, from a plurality of tasks associated with the user, a set of incomplete tasks, wherein each task in the set of incomplete tasks has a task-due timestamp and a reported status that indicates whether the task has been associated with a previous report targeted to the user, and when the task has been associated with the previous report, the reported status further indicates a reported timestamp associated with the previous report;
        generating a set of upcoming tasks, which is a first subset of the set of incomplete tasks, wherein the task-due timestamp, of each task in the set of upcoming tasks, is subsequent to the current time;

generating a set of overdue tasks, which is a second subset of the set of incomplete tasks, wherein the task-due timestamp, of each task in the set of overdue tasks, is previous to the current time;

generating a set of to-be-reported tasks, via one or more filtering criteria applied to the reported status of each task included in the set of upcoming tasks and each task included in the set of overdue tasks;

generating a task dialogue based on the set of to-be-reported tasks and a task dialogue template, wherein the task dialogue includes a natural language encoding of the reminder for the portion of the set of to-be-reported tasks; and providing the current report to the user, wherein the current report includes the task dialogue and a reminder for at least a portion of the tasks included in the set of to-be-reported tasks.

2. The method of claim 1, further comprising:
selecting the task dialogue template from a plurality of task dialogue templates based on the current time.

3. The method of claim 2, further comprising:
determining whether the task dialogue is a spoken dialogue or a text-based dialogue;
in response to determining that the task dialogue is the spoken dialogue, selecting a first task dialogue template from the plurality of task dialogue templates as the task dialogue template; and
in response to determining that the task dialogue template is the text-based dialogue, selecting a second task dialogue template from the plurality of task dialogue templates as the task dialogue template.

4. The method of claim 1, further comprising:
selecting the task dialogue template from a plurality of task dialogue templates based on at least one of a number of incoming tasks included in the set of to-be-reported tasks or a number of overdue tasks included in the set of to-be-reported tasks.

5. The method of claim 1, further comprising:
selecting the task dialogue template from a plurality of task dialogue templates based on a number of tasks included in the set of to-be-reported tasks.

6. The method of claim 1, wherein the task dialogue template includes predefined dialogue and one or more key-value pairs embedded in the predefined dialogue, and the method further comprising:
determining a value for each of the one or more key-value pairs based on one or more tasks included in the set of to-be-reported tasks; and
generating the task dialogue by substituting the value for each of the one or more key-vale pairs in the embedded predefined dialogue.

7. The method of claim 1, further comprising:
applying a first filtering criteria of the one or more filtering criteria to the set of upcoming tasks, wherein when applied to the set of upcoming tasks, the first filtering criteria removes each task from the set of upcoming tasks for which a corresponding upcoming task reminder has been included in the previous report.

8. The method of claim 1, further comprising:
applying a second filtering criteria of the one or more filtering criteria to the set of overdue tasks, wherein when applied to the set of overdue tasks, the second filtering criteria removes each task from the set of overdue tasks for which a corresponding overdue task reminder has been included in the previous report.

9. The method of claim 1, wherein identifying the set of incomplete tasks is based on a temporal period of relevancy that depends upon the current time such that the task-due timestamp for each task included in the set of incomplete tasks falls within the temporal period of relevancy.

10. The method of claim 9, wherein the temporal period of relevancy includes a current calendar day of the current time.

11. The method of claim 1, further comprising:
accessing an electronic calendar associated with the user;
identifying a set of calendar events included in the electronic calendar;
ranking the set of calendar events based on one or more priority scores for each event included in the set of calendar events;
filtering the set of calendar events based on the priority scores for each event included in the set of events; and
including a reminder for at least a portion of the filtered set of calendar events in the current report.

12. The method of claim 11, wherein the one or more priority scores for each event are based on whether the event is associated with employment for the user.

13. The method of claim 11, further comprising:
determining a current location of the user;
determining an event location for a first event included in the filtered set of calendar events;
accessing a traffic application to determine traffic information based on the current location of the user and the event location; and
including at least a portion of the traffic information in the current report.

14. The method of claim 1, further comprising:
determining a current location of the user;
accessing a weather application to generate a weather report for the current location of the user; and
including at least a portion of the weather report for the current location of the user in the current report.

15. The method of claim 1, further comprising:
determining a future location of the user based on travel plans of the user;
accessing a weather application to generate a weather report for the future location of the user; and
including at least a portion of the weather report for the location of the user in the current report.

16. The method of claim 1, further comprising:
accessing an electronically available new service to generate a current events report; and
including at least a portion of the current events report in the current report.

17. The method of claim 16, wherein the current events report includes audio content that is received from the new service and providing the report includes playing the audio content for the user via a speaker of the electronic device.

18. The method of claim 1, wherein the one or more filtering criteria is based on a number of times each task has been reported.

19. A non-transitory computer-readeable storage medium storing one or more programs, the one or more programs comprising instructions for operating a digital assistant, when the instructions are executed by one or more processors of an electronic device, cause the electronic device to perform operations comprising:
in accordance with receiving an audio signal at the electronic device and at a current time, wherein the audio signal encodes a spoken request for a current report targeted to a user that spoke the request, employing one or more processors and a memory of the electronic device, to perform actions comprising:

identifying, from a plurality of tasks associated with the user, a set of incomplete tasks, wherein each task in the set of incomplete tasks has a task-due timestamp and a reported status that indicates whether the task has been associated with a previous report targeted to the user, and when the task has been associated with the previous report, the reported status further indicates a reported timestamp associated with the previous report;

generating a set of upcoming tasks, which is a first subset of the set of incomplete tasks, wherein the task-due timestamp, of each task in the set of upcoming tasks, is subsequent to the current time;

generating a set of overdue tasks, which is a second subset of the set of incomplete tasks, wherein the task-due timestamp, of each task in the set of overdue tasks, is previous to the current time;

generating a set of to-be-reported tasks, via one or more filtering criteria applied to the reported status of each task included in the set of upcoming tasks and each task included in the set of overdue tasks;

generating a task dialogue based on the set of to-be-reported tasks and a task dialogue template, wherein the task dialogue includes a natural language encoding of the reminder for the portion of the set of to-be-reported tasks; and providing the current report to the user, wherein the current report includes the task dialogue and a reminder for at least a portion of the tasks included in the set of to-be-reported tasks.

20. The non-transitory computer-readable storage medium of claim 19, wherein the one or more programs further comprise instructions, which when executed by the one or more processors of the electronic device, cause the electronic device to perform operations comprising:
selecting the task dialogue template from a plurality of task dialogue templates based on the current time.

21. The non-transitory computer-readable storage medium of claim 20, wherein the one or more programs further comprise instructions, which when executed by the one or more processors of the electronic device, cause the electronic device to perform operations comprising:
determining whether the task dialogue is a spoken dialogue or a text-based dialogue;
in response to determining that the task dialogue is the spoken dialogue, selecting a first task dialogue template from the plurality of task dialogue templates as the task dialogue template; and
in response to determining that the task dialogue template is the text-based dialogue, selecting a second task dialogue template from the plurality of task dialogue templates as the task dialogue template.

22. The non-transitory computer-readable storage medium of claim 19, wherein the one or more programs further comprise instructions, which when executed by the one or more processors of the electronic device, cause the electronic device to perform operations comprising:
selecting the task dialogue template from a plurality of task dialogue templates based on at least one of a number of incoming tasks included in the set of to-be-reported tasks or a number of overdue tasks included in the set of to-be-reported tasks.

23. The non-transitory computer-readable storage medium of claim 19, wherein the one or more programs further comprise instructions, which when executed by the one or more processors of the electronic device, cause the electronic device to perform operations comprising:
selecting the task dialogue template from a plurality of task dialogue templates based on a number of tasks included in the set of to-be-reported tasks.

24. The non-transitory computer-readable storage medium of claim 19, wherein the task dialogue template includes predefined dialogue and one or more key-value pairs embedded in the predefined dialogue, and wherein the one or more programs further comprise instructions, which when executed by the one or more processors of the electronic device, cause the electronic device to perform operations comprising:
determining a value for each of the one or more key-value pairs based on one or more tasks included in the set of to-be-reported tasks; and
generating the task dialogue by substituting the value for each of the one or more key-vale pairs in the embedded predefined dialogue.

25. The non-transitory computer-readable storage medium of claim 19, wherein the one or more programs further comprise instructions, which when executed by the one or more processors of the electronic device, cause the electronic device to perform operations comprising:
applying a first filtering criteria of the one or more filtering criteria to the set of upcoming tasks, wherein when applied to the set of upcoming tasks, the first filtering criteria removes each task from the set of upcoming tasks for which a corresponding upcoming task reminder has been included in the previous report.

26. The non-transitory computer-readable storage medium of claim 19, wherein the one or more programs further comprise instructions, which when executed by the one or more processors of the electronic device, cause the electronic device to perform operations comprising:
applying a second filtering criteria of the one or more filtering criteria to the set of overdue tasks, wherein when applied to the set of overdue tasks, the second filtering criteria removes each task from the set of overdue tasks for which a corresponding overdue task reminder has been included in the previous report.

27. The non-transitory computer-readable storage medium of claim 19, wherein identifying the set of incomplete tasks is based on a temporal period of relevancy that depends upon the current time such that the task-due timestamp for each task included in the set of incomplete tasks falls within the temporal period of relevancy.

28. The non-transitory computer-readable storage medium of claim 27, wherein the temporal period of relevancy includes a current calendar day of the current time.

29. The non-transitory computer-readable storage medium of claim 19, wherein the one or more programs further comprise instructions, which when executed by the one or more processors of the electronic device, cause the electronic device to perform operations comprising:
accessing an electronic calendar associated with the user;
identifying a set of calendar events included in the electronic calendar;
ranking the set of calendar events based on one or more priority scores for each event included in the set of calendar events;
filtering the set of calendar events based on the priority scores for each event included in the set of events; and
including a reminder for at least a portion of the filtered set of calendar events in the current report.

30. The non-transitory computer-readable storage medium of claim 29, wherein the one or more priority scores for each event are based on whether the event is associated with employment for the user.

31. The non-transitory computer-readable storage medium of claim 29, wherein the one or more programs further comprise instructions, which when executed by the one or more processors of the electronic device, cause the electronic device to perform operations comprising:
   determining a current location of the user;
   determining an event location for a first event included in the filtered set of calendar events;
   accessing a traffic application to determine traffic information based on the current location of the user and the event location; and
   including at least a portion of the traffic information in the current report.

32. The non-transitory computer-readable storage medium of claim 19, wherein the one or more programs further comprise instructions, which when executed by the one or more processors of the electronic device, cause the electronic device to perform operations comprising:
   determining a current location of the user;
   accessing a weather application to generate a weather report for the current location of the user; and
   including at least a portion of the weather report for the current location of the user in the current report.

33. The non-transitory computer-readable storage medium of claim 19, wherein the one or more programs further comprise instructions, which when executed by the one or more processors of the electronic device, cause the electronic device to perform operations comprising:
   determining a future location of the user based on travel plans of the user;
   accessing a weather application to generate a weather report for the future location of the user; and
   including at least a portion of the weather report for the location of the user in the current report.

34. The non-transitory computer-readable storage medium of claim 19, wherein the one or more programs further comprise instructions, which when executed by the one or more processors of the electronic device, cause the electronic device to perform operations comprising:
   accessing an electronically available new service to generate a current events report; and
   including at least a portion of the current events report in the current report.

35. The non-transitory computer-readable storage medium of claim 34, wherein the current events report includes audio content that is received from the new service and providing the report includes playing the audio content for the user via a speaker of the electronic device.

36. The non-transitory computer-readable storage medium of claim 19, wherein the one or more filtering criteria is based on a number of times each task has been reported.

37. An electronic device comprising:
   one or more processors;
   a memory; and
   one or more programs, wherein the one or more programs are stored in the memory and configured to be executed by the one or more processors, in accordance with receiving an audio signal at the electronic device and at a current time, wherein the audio signal encodes a spoken request for a current report targeted to a user that spoke the request, the one or more programs including instructions for:
      identifying, from a plurality of tasks associated with the user, a set of incomplete tasks, wherein each task in the set of incomplete tasks has a task-due timestamp and a reported status that indicates whether the task has been associated with a previous report targeted to the user, and when the task has been associated with the previous report, the reported status further indicates a reported timestamp associated with the previous report;
      generating a set of upcoming tasks, which is a first subset of the set of incomplete tasks, wherein the task-due timestamp, of each task in the set of upcoming tasks, is subsequent to the current time;
      generating a set of overdue tasks, which is a second subset of the set of incomplete tasks, wherein the task-due timestamp, of each task in the set of overdue tasks, is previous to the current time;
      generating a set of to-be-reported tasks, via one or more filtering criteria applied to the reported status of each task included in the set of upcoming tasks and each task included in the set of overdue tasks;
      generating a task dialogue based on the set of to-be-reported tasks and a task dialogue template, wherein the task dialogue includes a natural language encoding of the reminder for the portion of the set of to-be-reported tasks; and
      providing the current report to the user, wherein the current report includes the task dialogue and a reminder for at least a portion of the tasks included in the set of to-be-reported tasks.

38. The electronic device of claim 37, wherein the one or more programs further include instructions for:
   selecting the task dialogue template from a plurality of task dialogue templates based on the current time.

39. The electronic device of claim 38, wherein the one or more programs further include instructions for:
   determining whether the task dialogue is a spoken dialogue or a text-based dialogue;
   in response to determining that the task dialogue is the spoken dialogue, selecting a first task dialogue template from the plurality of task dialogue templates as the task dialogue template; and
   in response to determining that the task dialogue template is the text-based dialogue, selecting a second task dialogue template from the plurality of task dialogue templates as the task dialogue template.

40. The electronic device of claim 37, the one or more programs further include instructions for:
   selecting the task dialogue template from a plurality of task dialogue templates based on at least one of a number of incoming tasks included in the set of to-be-reported tasks or a number of overdue tasks included in the set of to-be-reported tasks.

41. The electronic device of claim 37, wherein the one or more programs further include instructions for:
   selecting the task dialogue template from a plurality of task dialogue templates based on a number of tasks included in the set of to-be-reported tasks.

42. The electronic device of claim 37, wherein the task dialogue template includes predefined dialogue and one or more key-value pairs embedded in the predefined dialogue, and wherein the one or more programs further include instructions for:
   determining a value for each of the one or more key-value pairs based on one or more tasks included in the set of to-be-reported tasks; and
   generating the task dialogue by substituting the value for each of the one or more key-vale pairs in the embedded predefined dialogue.

43. The electronic device of claim 37, wherein the one or more programs further include instructions for:

applying a first filtering criteria of the one or more filtering criteria to the set of upcoming tasks, wherein when applied to the set of upcoming tasks, the first filtering criteria removes each task from the set of upcoming tasks for which a corresponding upcoming task reminder has been included in the previous report.

44. The electronic device of claim 37, wherein the one or more programs further include instructions for:

applying a second filtering criteria of the one or more filtering criteria to the set of overdue tasks, wherein when applied to the set of overdue tasks, the second filtering criteria removes each task from the set of overdue tasks for which a corresponding overdue task reminder has been included in the previous report.

45. The electronic device of claim 37, wherein identifying the set of incomplete tasks is based on a temporal period of relevancy that depends upon the current time such that the task-due timestamp for each task included in the set of incomplete tasks falls within the temporal period of relevancy.

46. The electronic device of claim 45, wherein the temporal period of relevancy includes a current calendar day of the current time.

47. The electronic device of claim 37, wherein the one or more programs further include instructions for:

accessing an electronic calendar associated with the user;
identifying a set of calendar events included in the electronic calendar;
ranking the set of calendar events based on one or more priority scores for each event included in the set of calendar events;
filtering the set of calendar events based on the priority scores for each event included in the set of events; and
including a reminder for at least a portion of the filtered set of calendar events in the current report.

48. The electronic device of claim 47, wherein the one or more priority scores for each event are based on whether the event is associated with employment for the user.

49. The electronic device of claim 47, wherein the one or more programs further comprise instructions, which when executed by the one or more processors of the electronic device, cause the electronic device to perform operations comprising:

determining a current location of the user;
determining an event location for a first event included in the filtered set of calendar events;
accessing a traffic application to determine traffic information based on the current location of the user and the event location; and
including at least a portion of the traffic information in the current report.

50. The electronic device of claim 37, wherein the one or more programs further include instructions for:

determining a current location of the user;
accessing a weather application to generate a weather report for the current location of the user; and
including at least a portion of the weather report for the current location of the user in the current report.

51. The electronic device of claim 37, wherein the one or more programs further include instructions for:

determining a future location of the user based on travel plans of the user;
accessing a weather application to generate a weather report for the future location of the user; and
including at least a portion of the weather report for the location of the user in the current report.

52. The electronic device of claim 37, wherein the one or more programs further include instructions for:

accessing an electronically available new service to generate a current events report; and
including at least a portion of the current events report in the current report.

53. The electronic device of claim 52, wherein the current events report includes audio content that is received from the new service and providing the report includes playing the audio content for the user via a speaker of the electronic device.

54. The electronic device of claim 37, wherein the one or more filtering criteria is based on a number of times each task has been reported.

* * * * *